US012571530B2

(12) United States Patent
Raghavan et al.

(10) Patent No.: US 12,571,530 B2
(45) **Date of Patent: *Mar. 10, 2026**

(54) SOLID-STATE LIGHTING FIXTURES WITH SOCKET CONNECTIONS FOR ACCESSORIES AND ACCESSORIES FOR USE THEREWITH

(71) Applicant: MAXLITE, INC., Pine Brook, NJ (US)

(72) Inventors: Ramesh Raghavan, Edison, NJ (US); Aymen Chami, Hackettstown, NJ (US); Eric Clohosey, Hawthorne, NJ (US); Stephen Andrew Entrekin, Chester, NJ (US); Xiaoming Dai, Ningbo (CN)

(73) Assignee: MAXLITE, INC., Pine Brook, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/301,575

(22) Filed: Aug. 15, 2025

(65) Prior Publication Data

US 2025/0383074 A1 Dec. 18, 2025

Related U.S. Application Data

(63) Continuation of application No. 19/245,587, filed on Jun. 23, 2025, now Pat. No. 12,455,070, which is a (Continued)

(51) Int. Cl.
*F21V 23/06* (2006.01)
*F21V 23/04* (2006.01)

(52) U.S. Cl.
CPC ............ *F21V 23/06* (2013.01); *F21V 23/045* (2013.01); *F21V 23/0464* (2013.01); *F21V 23/0471* (2013.01)

(58) Field of Classification Search
CPC .... F21V 23/06; F21V 23/045; F21V 23/0464; F21V 23/0471
See application file for complete search history.

(56) References Cited

U.S. PATENT DOCUMENTS 8,967,831 B2 * 3/2015 Chien .......................... F21V 3/02
362/249.02
D886,650 S 6/2020 Lan et al.
(Continued)

OTHER PUBLICATIONS

Sharkward Bi-level Microwave Sensor for High Bay Light ANT-5-4 Instruction Sheet (2020).
(Continued)

*Primary Examiner* — Mary Ellen Bowman
(74) *Attorney, Agent, or Firm* — Budzyn IP Law, LLC

(57) ABSTRACT

A solid-state lighting fixture assembly having a lighting fixture with a socket configured to receive a plug associated with one or more accessories to allow for easy in-field mounting of accessories, e.g., controls, onto installed lighting fixtures. The socket may be internally electrically connected to an auxiliary power output of a driver and/or to a battery power pack within the lighting fixture assembly, thereby providing direct-current voltage power for the accessory and, also, allowing for signal transmission to and from the accessory. Each accessory includes one or more sensors and communication components to provide the connected lighting fixture assembly with specific capabilities including, but not limited to, motion detection, ambient light level detection, ambient temperature measurement and wireless communications. The wireless communication can also be used to control one or a group of lighting fixtures and transmit sensor data associated with, for example, monitoring space utilization and asset tracking.

13 Claims, 28 Drawing Sheets

Related U.S. Application Data continuation of application No. 18/664,799, filed on May 15, 2024, now Pat. No. 12,338,984, which is a continuation of application No. 18/076,565, filed on Dec. 7, 2022, now Pat. No. 11,988,370, which is a continuation of application No. 17/557,306, filed on Dec. 21, 2021, now Pat. No. 11,549,675, which is a continuation of application No. 17/215,852, filed on Mar. 29, 2021, now Pat. No. 11,215,350.

(60) Provisional application No. 63/048,373, filed on Jul. 6, 2020.

(56) References Cited

U.S. PATENT DOCUMENTS

| | | | | |
|---|---|---|---|---|
| D886,651 | S | 6/2020 | Lan et al. | |
| 10,948,940 | B2 | 3/2021 | Lan et al. | |
| 10,952,304 | B2 | 3/2021 | Lan et al. | |
| 11,215,350 | B1 * | 1/2022 | Raghavan | F21V 23/06 |
| D959,377 | S | 8/2022 | Lan et al. | |
| 11,549,675 | B2 * | 1/2023 | Raghavan | F21V 23/045 |
| 11,988,370 | B2 * | 5/2024 | Raghavan | F21V 23/06 |
| D1,055,737 | S | 12/2024 | Smith et al. | |
| 12,455,070 | B1 * | 10/2025 | Raghavan | F21V 23/0471 |
| 2005/0281030 | A1 * | 12/2005 | Leong | H05B 47/19 362/234 |
| 2008/0007943 | A1 * | 1/2008 | Verfuerth | F21S 8/06 29/729 |
| 2008/0007944 | A1 * | 1/2008 | Verfuerth | F21S 8/06 362/373 |
| 2009/0046457 | A1 * | 2/2009 | Everhart | F21V 23/009 362/235 |
| 2009/0141499 | A1 * | 6/2009 | Fabbri | F21S 8/046 362/276 |
| 2011/0305056 | A1 * | 12/2011 | Chien | H01R 13/6691 363/178 |
| 2015/0271375 | A1 * | 9/2015 | Chien | F21V 23/04 348/143 |
| 2015/0345775 | A1 * | 12/2015 | Chien | F21V 33/0004 362/234 |
| 2016/0238196 | A1 * | 8/2016 | Fondeur | F21K 9/23 |
| 2018/0087760 | A1 * | 3/2018 | Clynne | F21V 5/04 |

OTHER PUBLICATIONS

Sharkward Bi-level Microwave Sensor for High Bay Light ANT-5-4-2 Instruction Sheet (2020).
Sharkward Bi-level PIR Sensor for High Bay Light ANT-6-4 Instruction Sheet (2020).

* cited by examiner

Ambient Light Receiving Circuit

Dimming Switch

PIR Sensor circuit

Bluetooth (BLE) Circuit

SOLID-STATE LIGHTING FIXTURES WITH SOCKET CONNECTIONS FOR ACCESSORIES AND ACCESSORIES FOR USE THEREWITH

CROSS-REFERENCE TO RELATED APPLICATIONS

This application is a continuation of U.S. patent application Ser. No. 19/245,587, filed Jun. 23, 2025, now pending, which is a continuation of U.S. patent application Ser. No. 18/664,799, filed May 15, 2024, now U.S. Pat. No. 12,338,984, which is a continuation of U.S. patent application Ser. No. 18/076,565, filed Dec. 7, 2022, now U.S. Pat. No. 11,988,370, which is a continuation of U.S. patent application Ser. No. 17/557,306, filed Dec. 21, 2021, now U.S. Pat. No. 11,549,675, which is a continuation of U.S. patent application Ser. No. 17/215,852, filed Mar. 29, 2021, now U.S. Pat. No. 11,215,350, which claims priority to U.S. Provisional Patent Appl. No. 63/048,373, filed Jul. 6, 2020, the entire contents of which are incorporated by reference herein.

BACKGROUND OF THE INVENTION

Solid-state lighting fixtures are well known in the prior art, particularly in connection with light emitting diodes (LED). Many of these lighting fixtures are provided with accessories, such as, sensors for detecting ambient conditions in controlling light output from the fixtures. The sensors may detect an ambient level of darkness, e.g., detecting dusk or dawn, in determining whether light output is required. In addition, sensors may detect motion, thus causing light activation upon detection of movement of an individual or object (e.g., a vehicle) in an area.

Sensors must be wired and properly connected to a driver of a light fixture to provide power to the sensor and to allow signal transmission to the driver to respond to sensor readings. Since internal wiring is required, sensors are generally factory mounted, with customers pre-specifying the sensors upon ordering light fixtures. Later in-field retrofitting of light fixtures to add sensors, or other accessories, is costly and time intensive due to the typical need to disassemble the light fixtures, possibly even requiring the dismounting of the fixture.

SUMMARY OF THE INVENTION

In one aspect, the subject invention provides a solid-state lighting fixture assembly having a lighting fixture with a socket configured to receive a plug associated with one or more accessories. The subject invention allows for easy in-field mounting of accessories, e.g., controls, onto installed lighting fixtures. The plug and socket may be configured to provide together a connection in accordance with set standards. The socket may be internally electrically connected to an auxiliary power output of the driver and/or to a battery power pack within the lighting fixture assembly, thereby providing direct-current voltage power for the accessory and, also, allowing for signal transmission. Various plug/socket combinations may be utilized including, but not limited to, audio plug/jack combinations and USB connector/port combinations. Advantageously, the subject invention provides for a low-cost arrangement for in-field accessory retrofitting of solid-state lighting fixtures without disassembly of the fixtures.

As used herein, the term “socket” covers any opening or hollow configured to hold and electrically couple with a plug or connector. By way of non-limiting examples, a “socket” may be a jack or a port.

These and other features of the subject invention will be better understood through a study of the following detailed description and accompanying drawings.

DETAILED DESCRIPTION OF THE INVENTION

Figure 1:
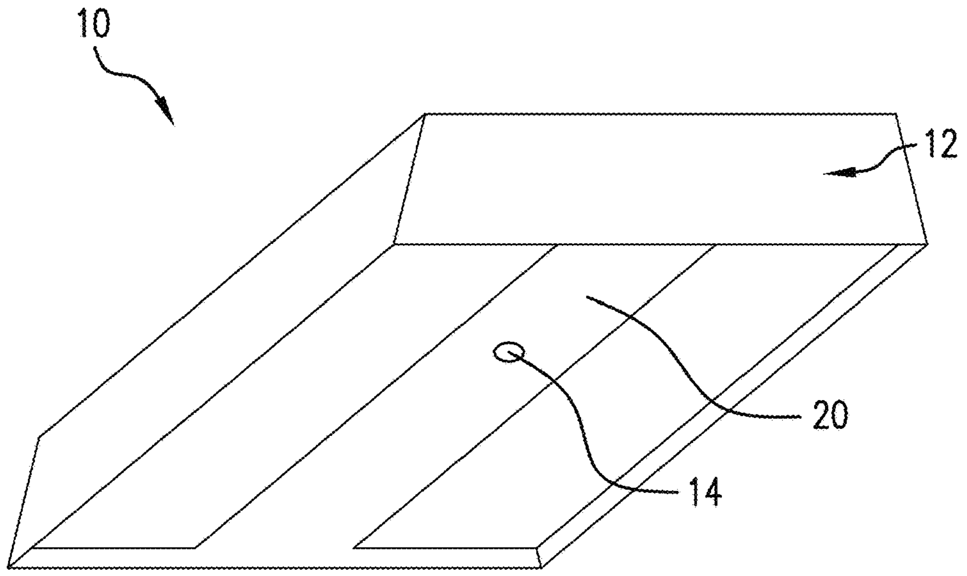
FIGS. 1-2 show a solid-state lighting fixture assembly in accordance with the subject invention.
Figure 2:
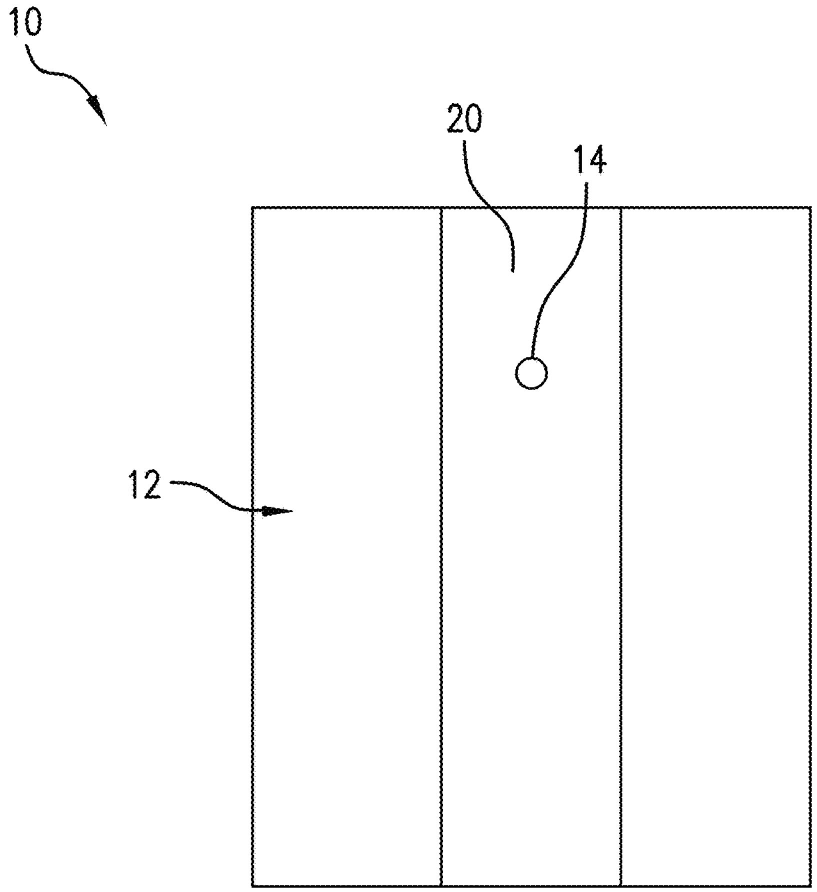
Figure 3:
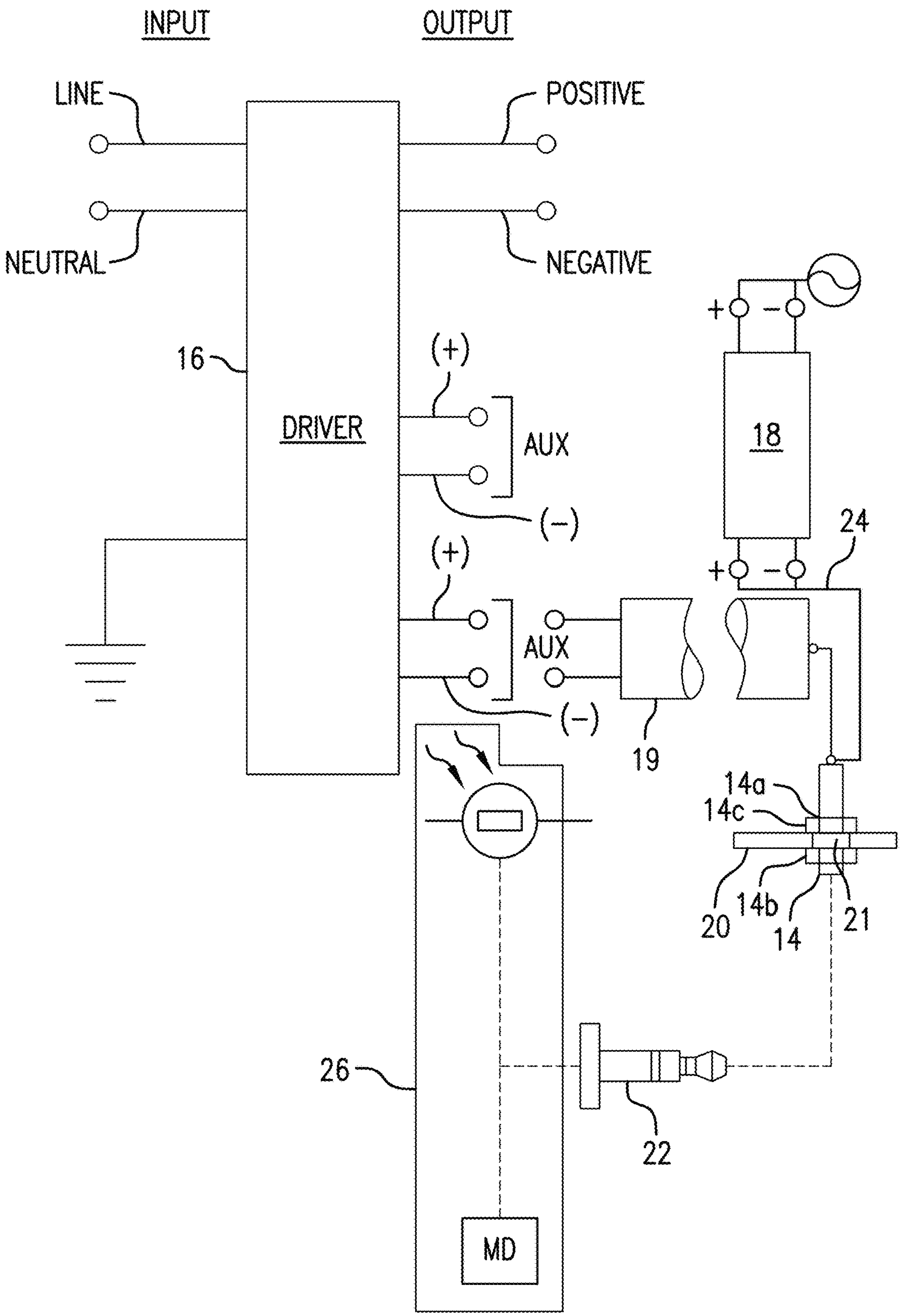
FIG. 3 is a schematic of a driver, plug, and socket arrangement useable with the subject invention.

With reference to FIGS. 1-3, a solid-state lighting fixture assembly 10 is shown which generally includes a solid-state lighting fixture 12 and a socket 14. The solid-state lighting fixture 12 may be of any configuration which utilizes solid-state lighting elements for generating light, such as LEDs, OLEDs (organic light emitting diodes), and QLEDs (quantum light emitting diodes), and a driver 16 for AC/DC power conversion and control of the lighting elements. The driver 16, as is known in the art, may include auxiliary power output connections to allow for electrical output to be provided as direct current voltage in the range of 10-12 volts DC. In addition, or alternatively, the solid-state lighting fixture assembly 10 may include a battery power pack 18, to provide direct-current power from storage, in the range of 10-12 volts DC. The driver 16 may include: standard controls for activating and deactivating the lighting elements; lighting controls (e.g., dimmer); and/or, battery back-up connections.

The solid-state lighting fixture 12 may be of any known type. FIGS. 1 and 2 show a troffer-type lighting fixture for illustrative purposes. As will be recognized by those skilled in the art, any type of solid-state lighting fixture may be utilized. By way of non-limiting example, the solid-state lighting fixture 12 may be for industrial or residential use in any form, including, but not limited to a troffer, wall pack, high bay light fixture, canopy luminaire, linear light fixture, flood luminaire, area luminaire, bollard, pendant light fixture, and so forth, which may be mounted in any manner, including, but not limited to, ceiling mounted, wall mounted, pole mounted, suspended, and so forth. In addition, the lighting fixture 12 may be for indoor or outdoor use.

The solid-state lighting fixture 12 includes a body 20 to which is mounted the socket 14. Preferably, the socket 14 is factory-installed during manufacturing of the solid-state lighting fixture 12. Preferably, the socket 14 is located on a surface of the body 20 which is externally accessible without the need for removal of surrounding structure or elements, such as wall panels, ceiling tiles, brackets, and so forth. For example, as shown in FIGS. 1 and 2, the socket 14 may be located on a downward facing surface of the body 20, with the solid-state lighting fixture 12 being a troffer, thus, being accessible without need for removing ceiling tiles or accessing a rear portion of the solid-state lighting fixture 12. To limit vandalism or theft of an accessory, the socket 14 may be located on an external surface of the body 20 but hidden from view in normal use, e.g., in the rear of the solid-state lighting fixture 12, above a ceiling. Alternatively, the socket 14 may be located internally of the body 20, e.g., where the solid-state lighting fixture 12 is intended for outdoor use. This protects the socket 14 from exposure to moisture. Preferably, with internal mounting, it is preferred that the socket 14 be accessible with removal of minimal parts, such as being located behind an access panel that can be removed without disassembly of the solid-state lighting fixture 12.

As shown in FIG. 3, an exemplary driver 16 is schematically shown having power inputs for receiving alternating-current power (line, neutral) and power outputs (positive, negative) for providing direct-current power to light generating elements of the solid-state lighting fixture 12. As is known in the art, the driver 16 may include an integrated circuit chip, acting as a microprocessor, to control the driver 16. Electrical components, such as capacitors, resistors, inductors, and so forth may be provided to configure the driver 16 to have a constant-voltage output or a constant-current output, as needed. One or more sets of auxiliary power outputs (aux) may be provided with positive and negative direct-current power outputs. The auxiliary power outputs may provide power in the range of 10-12 volts DC for external use. Electrical conductor 19 may be provided electrically connected to one of the auxiliary power outputs to convey direct-current electrical power to the socket 14. The driver 16 may be configured to respond to signals (electrical, data) received via the auxiliary power outputs, e.g., to turn on/off the solid-state lighting fixture 12, to dim/brighten the solid-state lighting fixture 12, etc. In addition, or alternatively, the battery power pack 18 may be connected to the socket 14 by electrical conductor 24 to provide power thereto. As is known in the art, the battery power pack 18 may be connected to alternating-current power to provide charge to the battery power pack 18.

Figure 4:
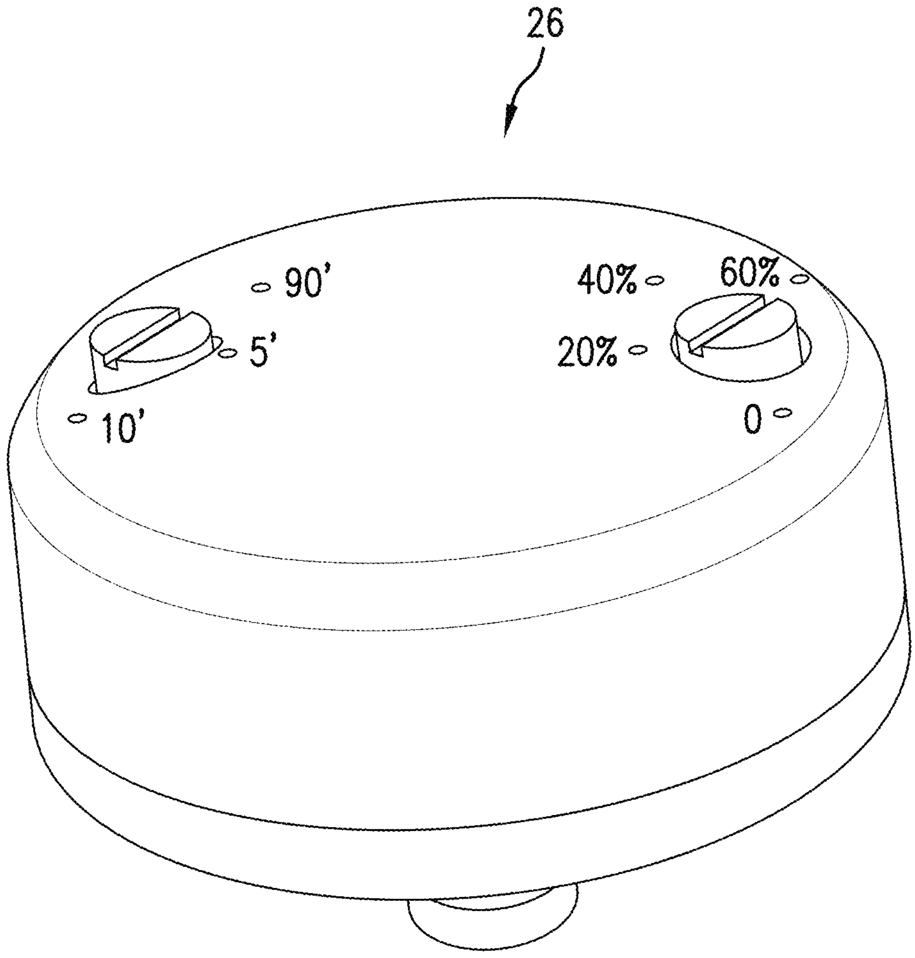
FIG. 4 shows an accessory mounted to a solid-state lighting fixture in accordance with the subject invention.
Figure 5:
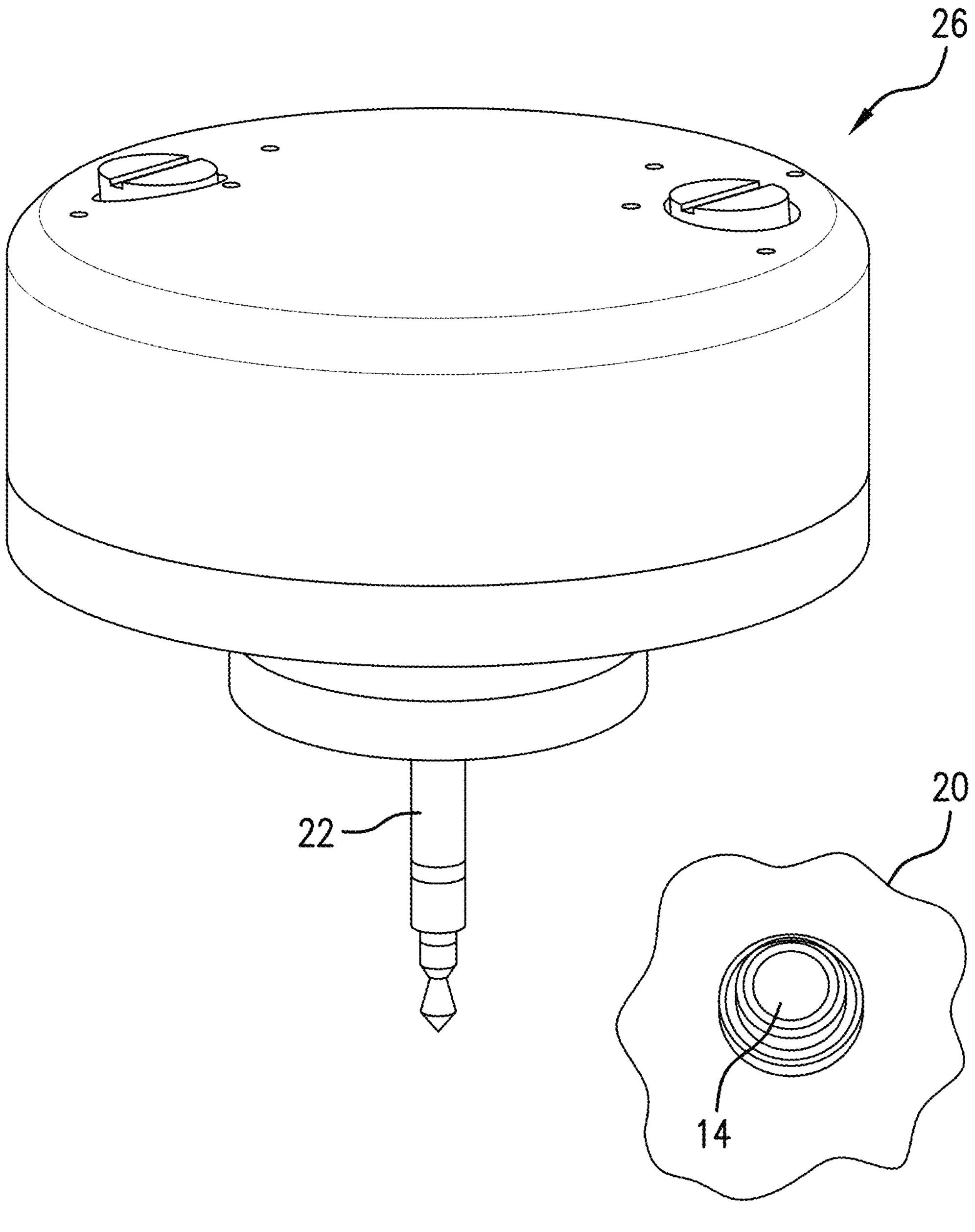
FIG. 5 shows an accessory, having a jack-plug mounting, and a socket on a solid-state lighting fixture in accordance with the subject invention.
Figure 6:
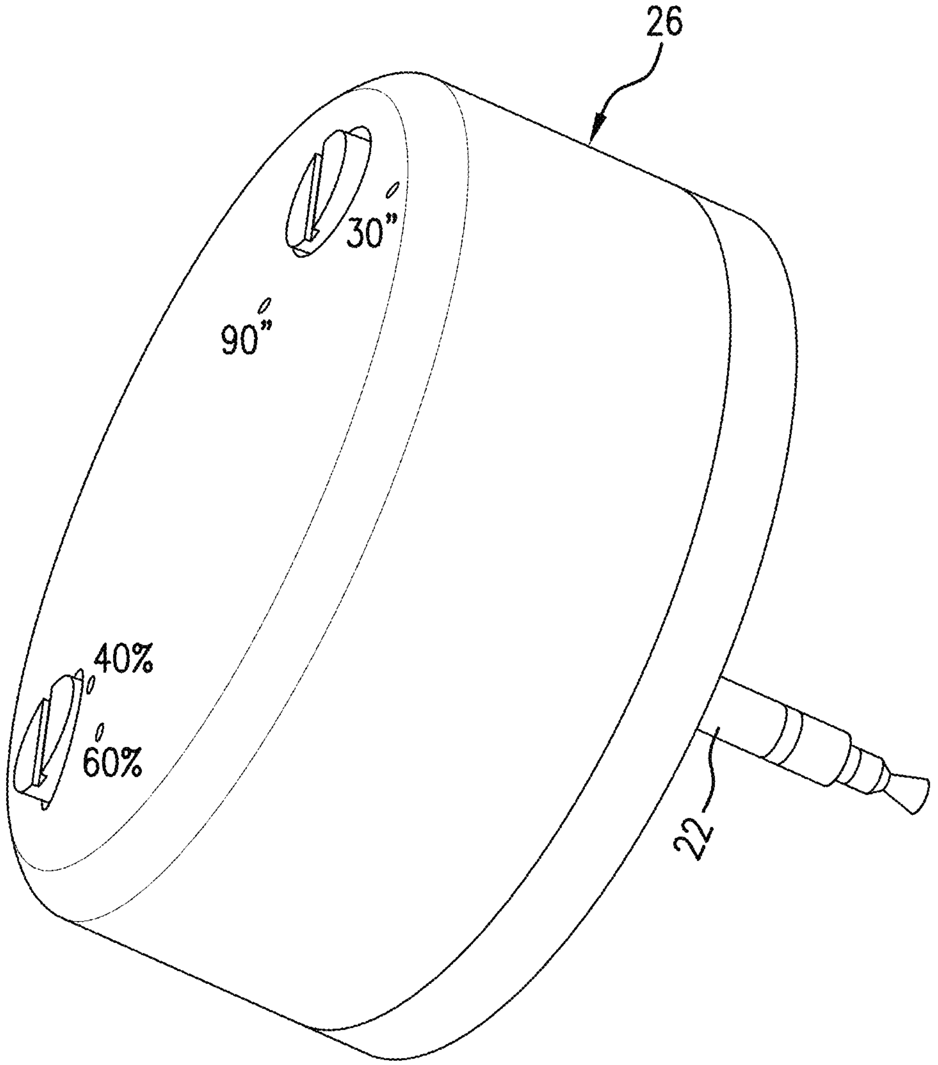
FIG. 6 shows an accessory having a jack-plug mounting useable with the subject invention.

As shown in FIGS. 4-6 one or more accessories 26 may be mounted to the socket 14 using a plug 22. The accessory 26 may be a type of controller for sending electrical signals to the driver 16 to control light output, e.g., causing light to switch on/off, causing light to dim/brighten, etc. The accessory 26 may be in the form of a sensor for detecting ambient conditions, including being configured to detect level of light, or to detect motion of an object or person. Any sensor type may be utilized, including, but not limited to, bi-level microwave sensors and bi-level PIR sensors. In addition, or, alternatively, the accessory 26 may be a networked controller, e.g., being web-enabled to interact as a device on the Internet-of-things (IoT), having a wireless receiver for receiving wireless control signals from a separate controller, such as a smartphone, computer, network hub, and so forth. This allows for wireless control of the solid-state lighting fixture 12, on an individual level and/or on a network level. Any wireless configuration may be utilized, including, but not limited to, Bluetooth, ZigBee, and so forth. The accessory 26 may also include a wireless transceiver to allow for two-way communication between other elements, in or outside the network. The plug 22 is provided on the accessory 26 to transmit power thereto and to transmit electronic signals to and from the accessory 26 via the socket 14. The plug 22 is electrically coupled to components of the accessory 26 using any technique (e.g., wiring) to convey power thereto and/or to uni- or bi-directionally convey electronic signals thereto/therewith.

As will be appreciated by the those skilled in the art, the wireless transmitter of the accessory 26 may allow for data to be transmitted to the driver 16 and/or other devices, including remote cloud storage. This allows for data collection and/or data transmission, e.g., regarding the operation of the solid-state lighting fixture 12, ambient conditions, maintenance of the solid-state lighting fixture 12, and so forth. For example, data may be collected which allows for review of on/off states, frequency and timing of on/off, etc. of the solid-state lighting fixture 12. In addition, with use of the accessory 26, ambient conditions, such as temperature, humidity, and acidity, may be also collected and transmitted for storage and review. Web-enabling software for the driver 16 and/or the accessory 26 may be included with a computing processing unit (CPU) that may be provided with the solid-state lighting fixture 12. Any such CPU may be wirelessly coupled with the accessory 26 and/or hard-wired coupled to the socket 14 for connection with the accessory 26 via the plug 22. Note that the above-described data collection and/or transmission can be used for many purposes such as controlling one or a group of light fixtures-on/off/dim based on a set of preprogrammed instructions using a remote or applications on connected smart device, controlling other aspects of the light fixture such as color modulation and human centric lighting, and for transmitting the collected data to remote analysis to provide, for example, space utilization monitoring and/or asset tracking.

Figure 7:
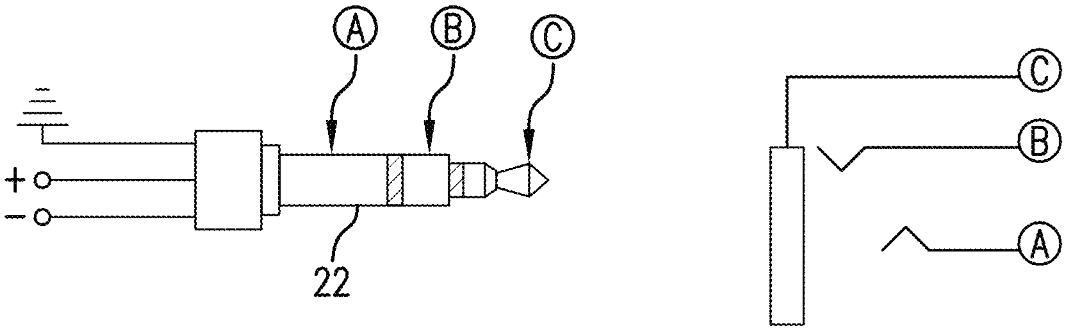
FIG. 7 shows an exemplary three-contact jack plug.

As shown in FIGS. 3-8, the socket 14 and the plug 22 may be configured as an audio jack and plug combination. As an audio jack and plug combination, the socket 14 and the plug 22 may be formed in accordance with any known standard including, but not limited to, WE-309, WE-310, BP0316, EIA RS-453, and IEC 60603-11. As shown in FIG. 7, the plug 22, as an audio jack plug, may be provided with two or more contacts, as is known in the art. FIG. 7 shows a possible three-contact arrangement useable with the subject invention, with contacts A, B, C, useable as positive and negative contacts and a ground. Other jack plug arrangements, including at least two contacts (allowing for positive and negative electrical flow and data flow (e.g., signal over power data transmission)) may be utilized. The socket 14 is selected to correspond to the plug 22, including the number of contacts provided on the plug 22. As an audio jack, the socket 14 may be through-panel-mounted to the body 20, as shown in FIG. 3, with the socket 14 having a socket body 14*a* extending through an opening 21 in the body 20. A collar 14*b* may be located about the socket opening 21 with a locking nut 14*c* being threaded mounted onto the socket body 14*a*. The collar 14*b* may have a polygonal, e.g., hexagonal, profile for engagement with a mounting tool, e.g., a wrench. With tightening of the locking nut 14*c*, the collar 14*b* and the locking nut 14*c* generate pressure against the body 20 about the opening 21 to hold the socket 14 in place. The locking nut 14*c* and/or the body 20 may be configured to limit loosening, for example, by being provided with features on a face thereof intended to enhance frictional engagement between the locking nut 14*c* and the body 20 (e.g., raised portions (ribs, detents) being provided). Washers, lock washers and/or adhesive may be provided between the locking nut 14*c* and the socket body 14*a* and/or the body 20 to limit loosening of the locking nut 14*c* during use, particularly due to vibration.

Figure 9:
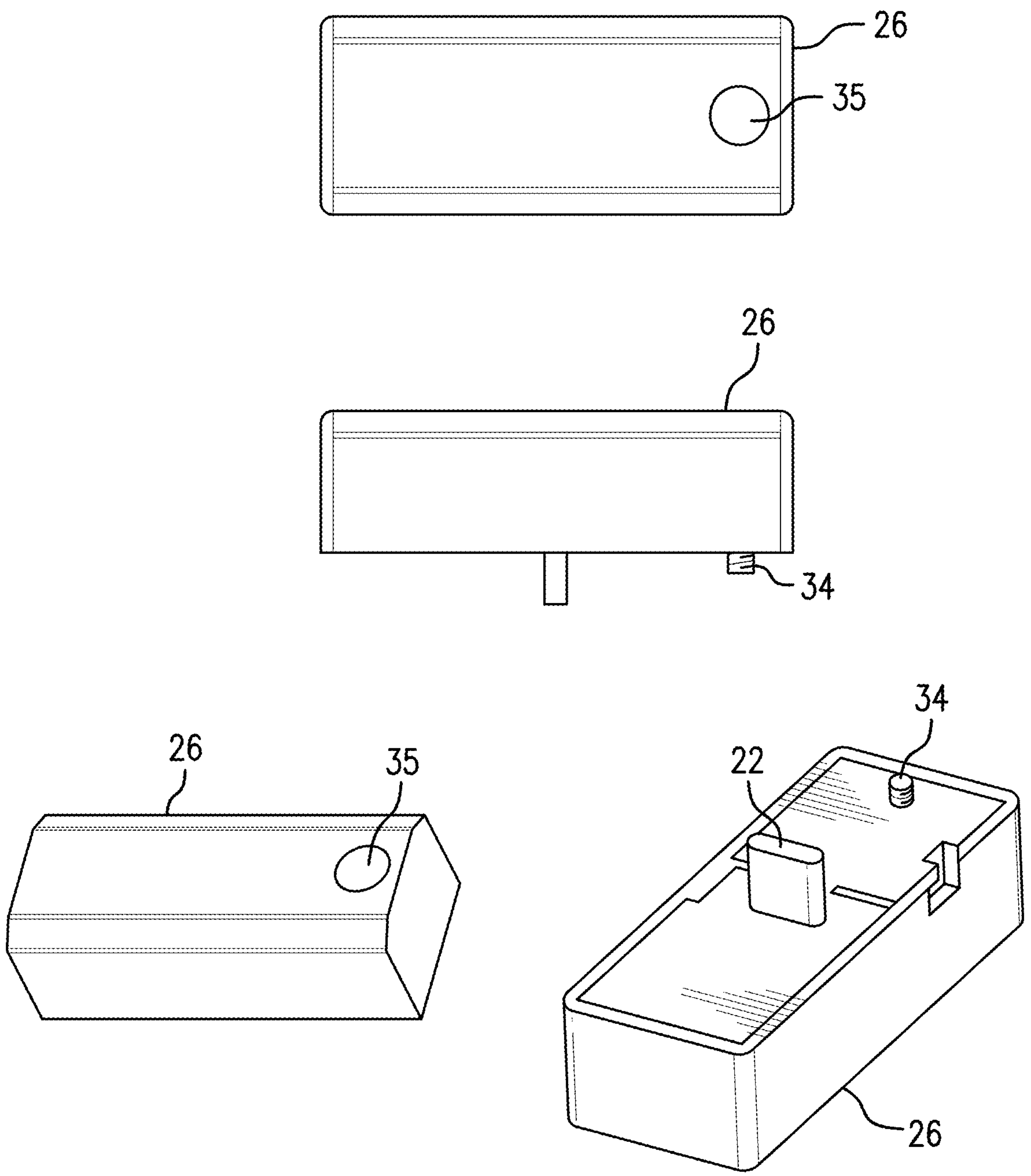
FIGS. 9-20 show different embodiments of plugs and sockets, being configured as a USB connector/port, in accordance with the subject invention.
Figure 10:
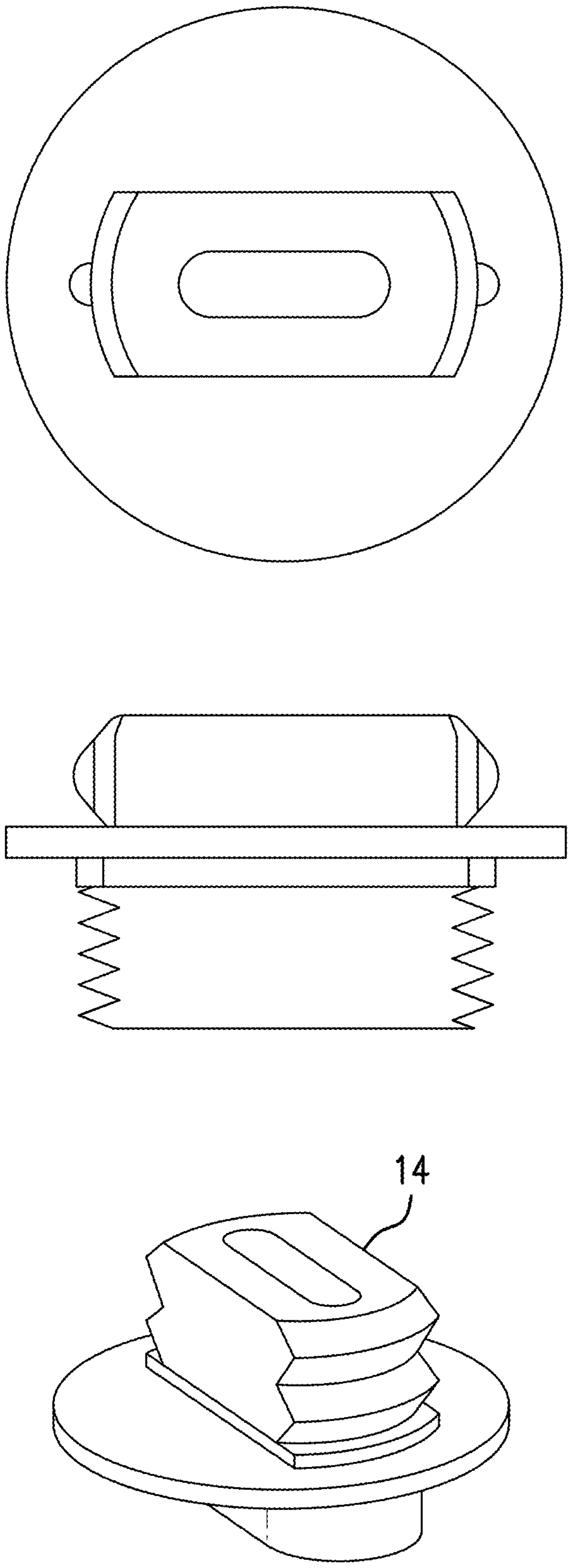
Figure 11:
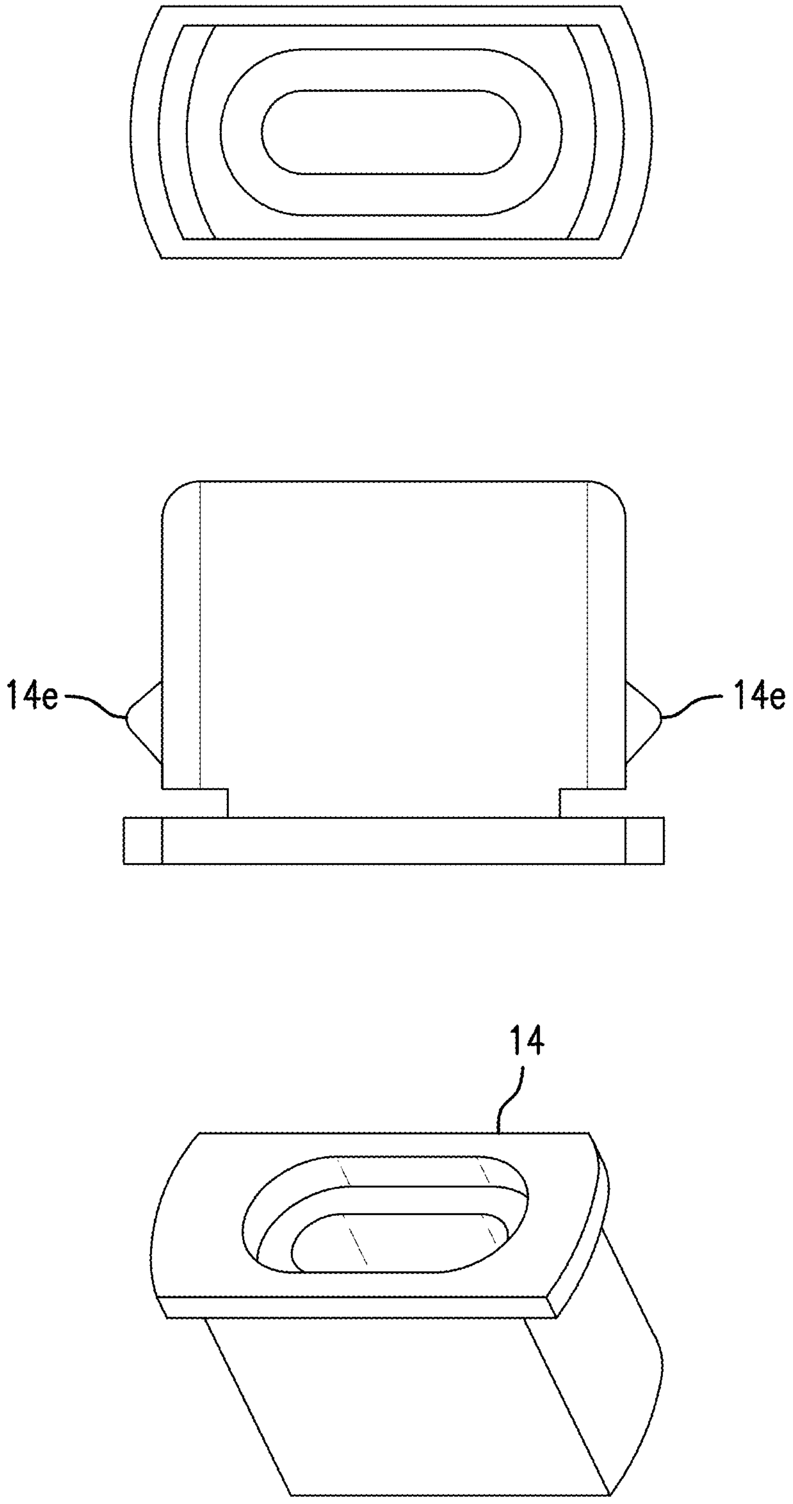
Figure 12:
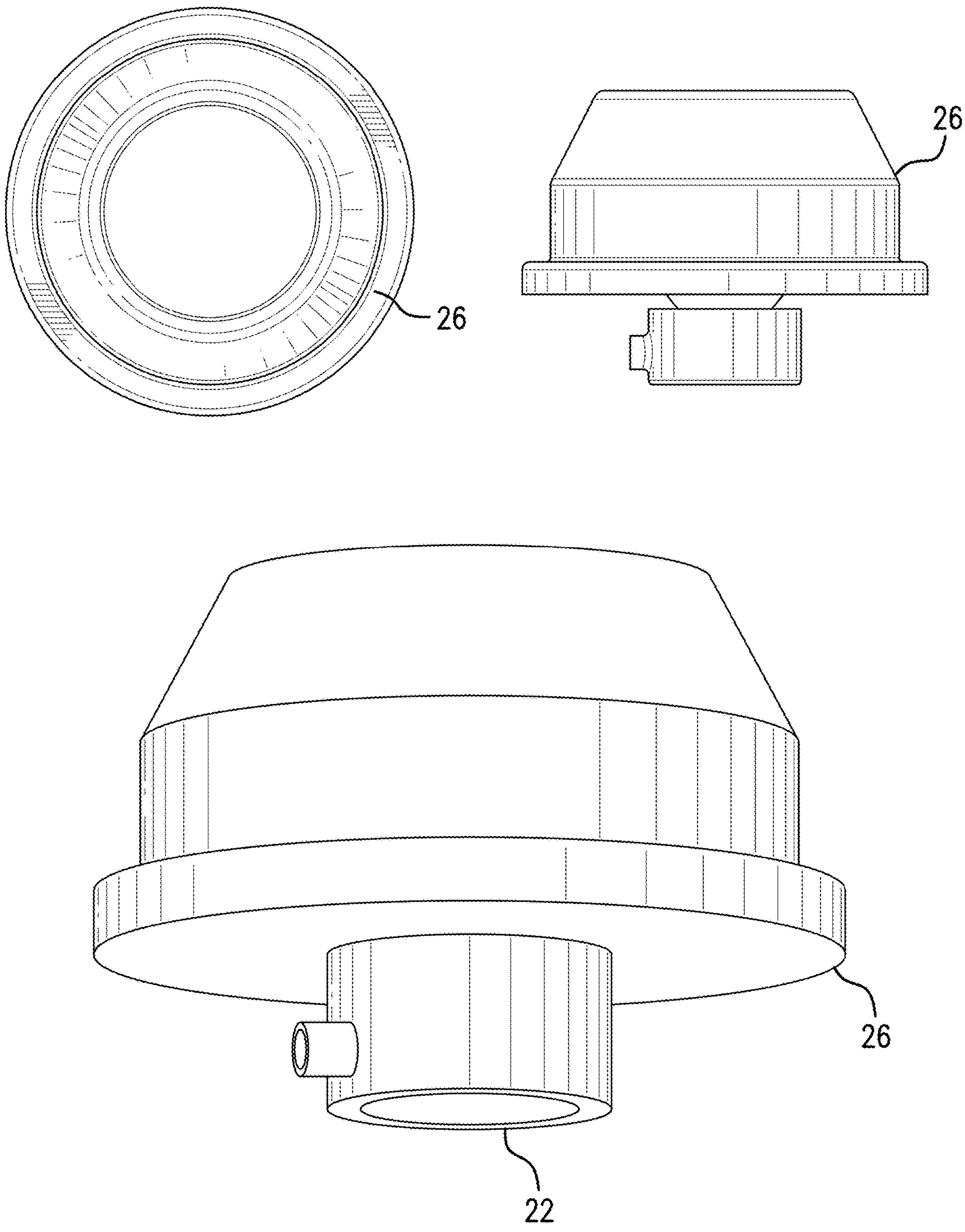
Figure 13:
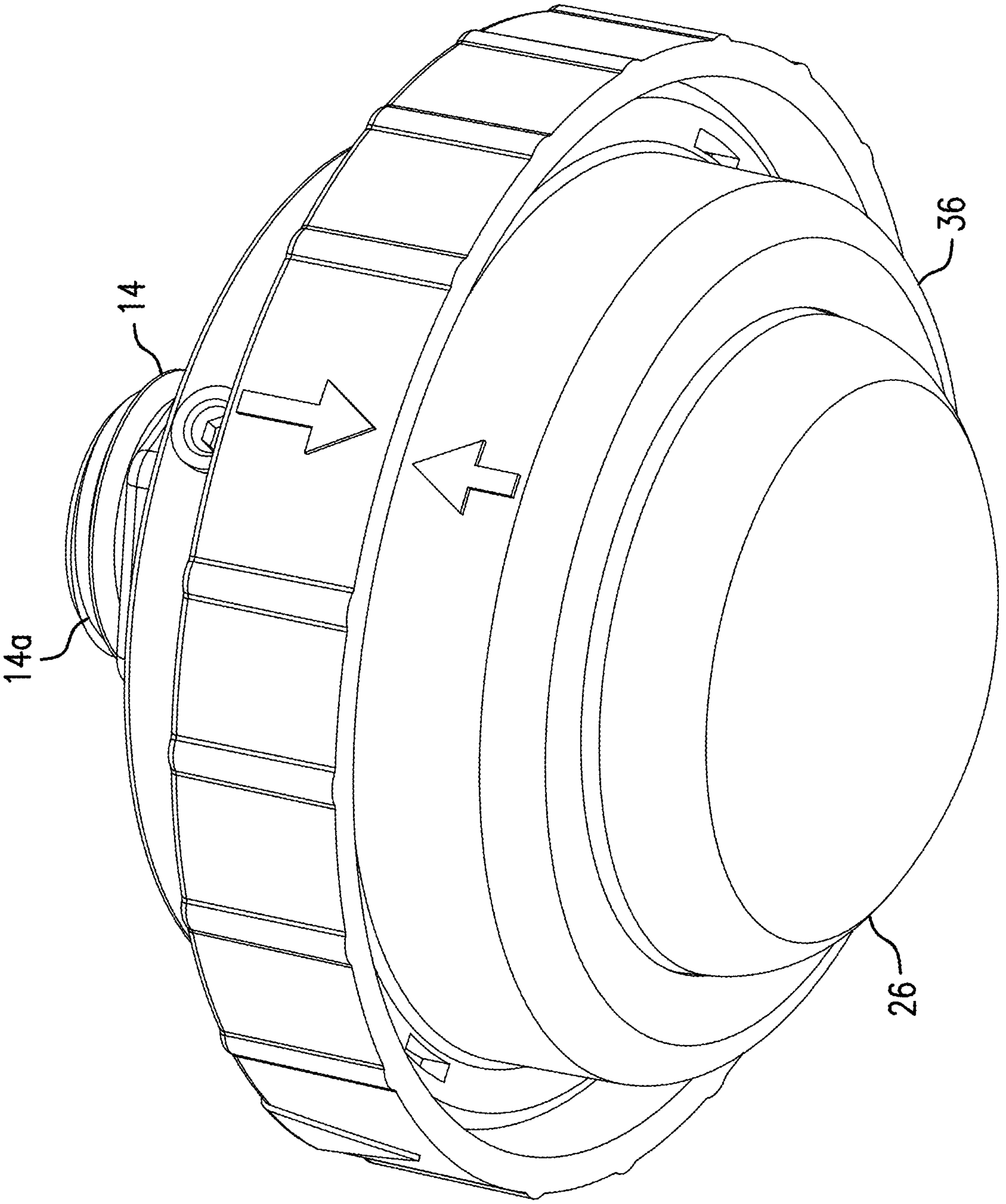
Figure 14:
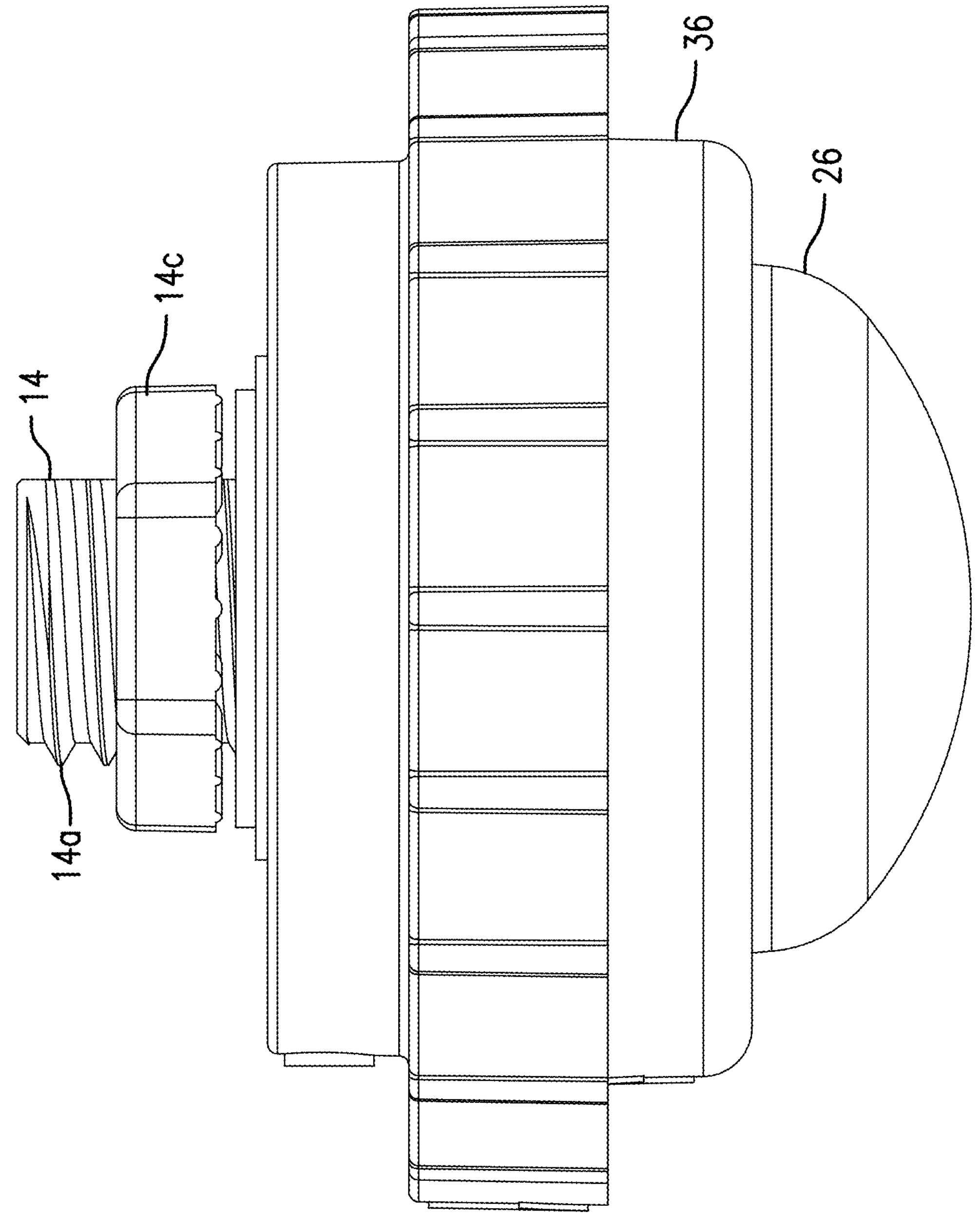
Figure 15:
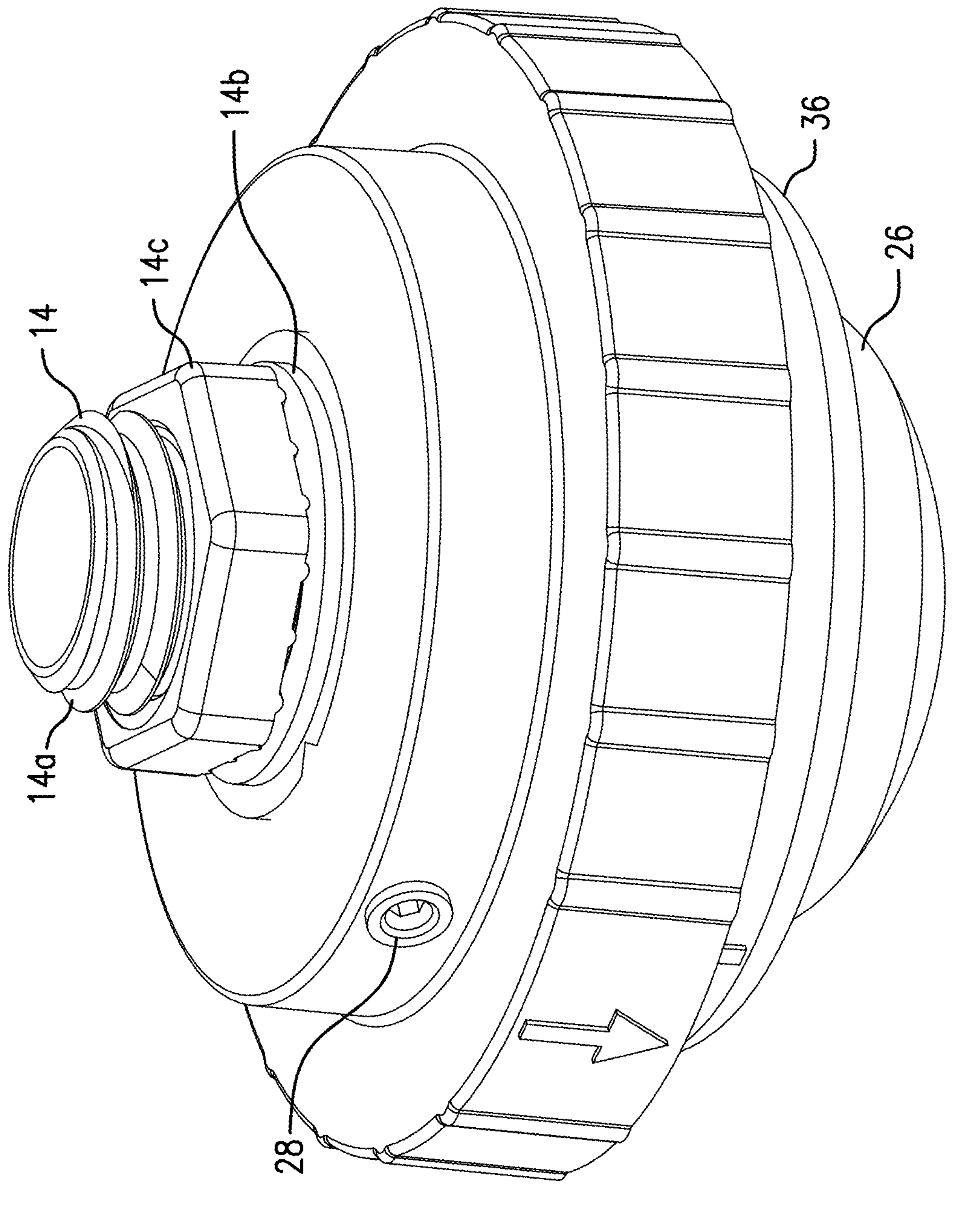

Alternatively, as shown in FIGS. 9-20, the socket 14 and the plug 22 may be configured as a USB connector/port combination. The accessory 26 may be provided with the plug 22 configured as a USB connector, as shown in FIGS. 9 and 12. The socket 14 may be configured as a USB port, as shown in FIGS. 10 and 11. The USB connector/port may be formed as any USB connector/port, including, but not limited to, any USB connector/port formed in accordance with specifications promulgated by the USB Implementers Forum, Inc. (USB-IF, www.usb.org). The USB connector/port provides data lines in addition to power lines, thereby allowing data transmission, in addition to power transmission, between the accessory 26 and the driver 16. This allows for linking with the driver 16 and/or any CPU provided with the solid-state lighting fixture 12. By way of non-limiting example, the socket 14 and the plug 22 may be configured as a USB-C connector/port, providing for a double-sided twenty-four pin connection. Other multi-pin USB connection configurations may be utilized.

As will be recognized by those skilled in the art, the socket 14 and the plug 22 may be configured to various recognized standards, including, but not limited to, Apple Lighting, Thunderbolt, MIDI, FireWire, and so forth.

A gasket or other rubber element may be provided about the socket 14 to minimize vibration in the accessory 26 when mounted. In addition, the gasket or other rubber element may provide a frictional interface against the accessory 26 which restricts inadvertent rearward movement and possible loss of connection.

Figure 8A:
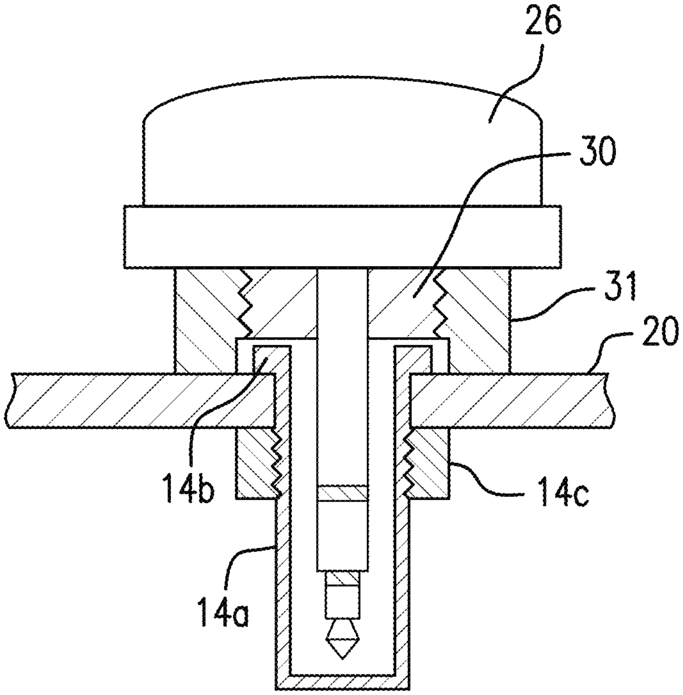
FIGS. 8 and 8A show a threaded collar useable with a plug, in accordance with the subject invention.
Figure 8:
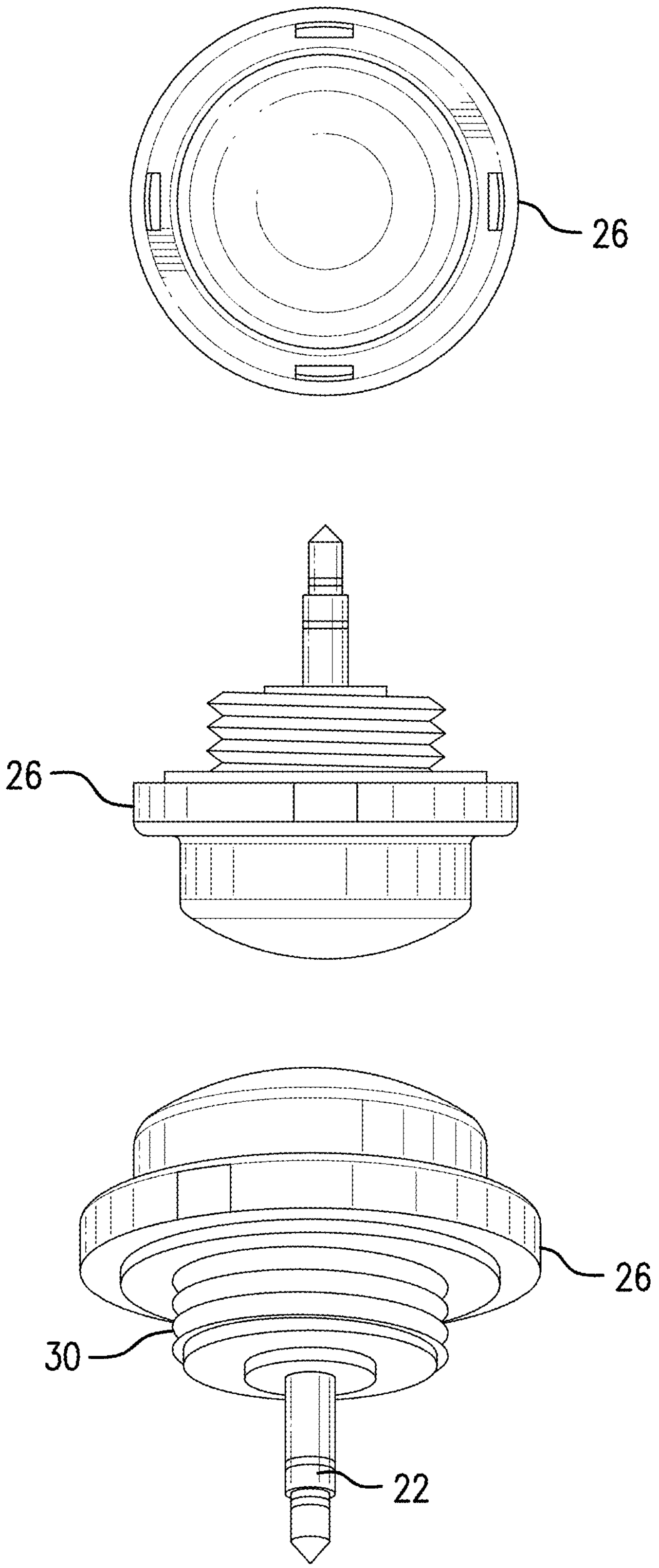

In addition, a lock or other security measure may be provided to restrict removal of the accessory 26 once mounted and/or to resist loosening of the accessory 26 due to vibration or other external factors. With the accessory 26 being exposed in a mounted state, the accessory 26 may be subjected to vandalism or theft. A locking ring may be mounted about the socket 14 which allows insertion of the plug 22 into the socket 14, but resists rearward removal thereof. Alternatively, as shown in FIGS. 8 and 8A, a threaded collar 30 may be provided about the plug 22 for threaded engagement with an internally-threaded ring 31 fixed to the body 20 about the socket 14. The plug 22, configured as an audio jack plug, may be rotated with insertion into the socket 14, configured as an audio jack. Adhesive may be provided along the threaded connection to inhibit removal of the plug 22.

Figure 16:
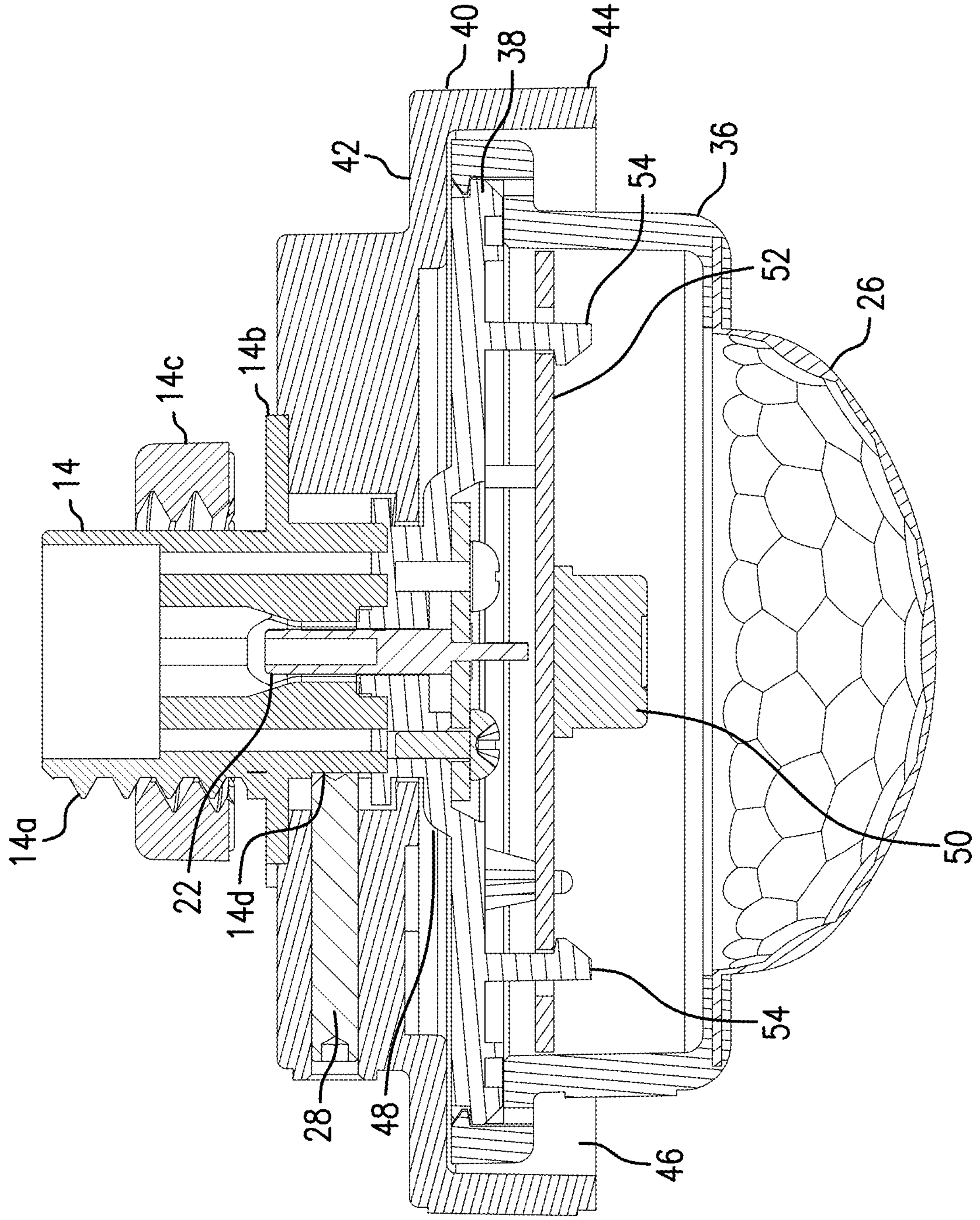
Figure 17:
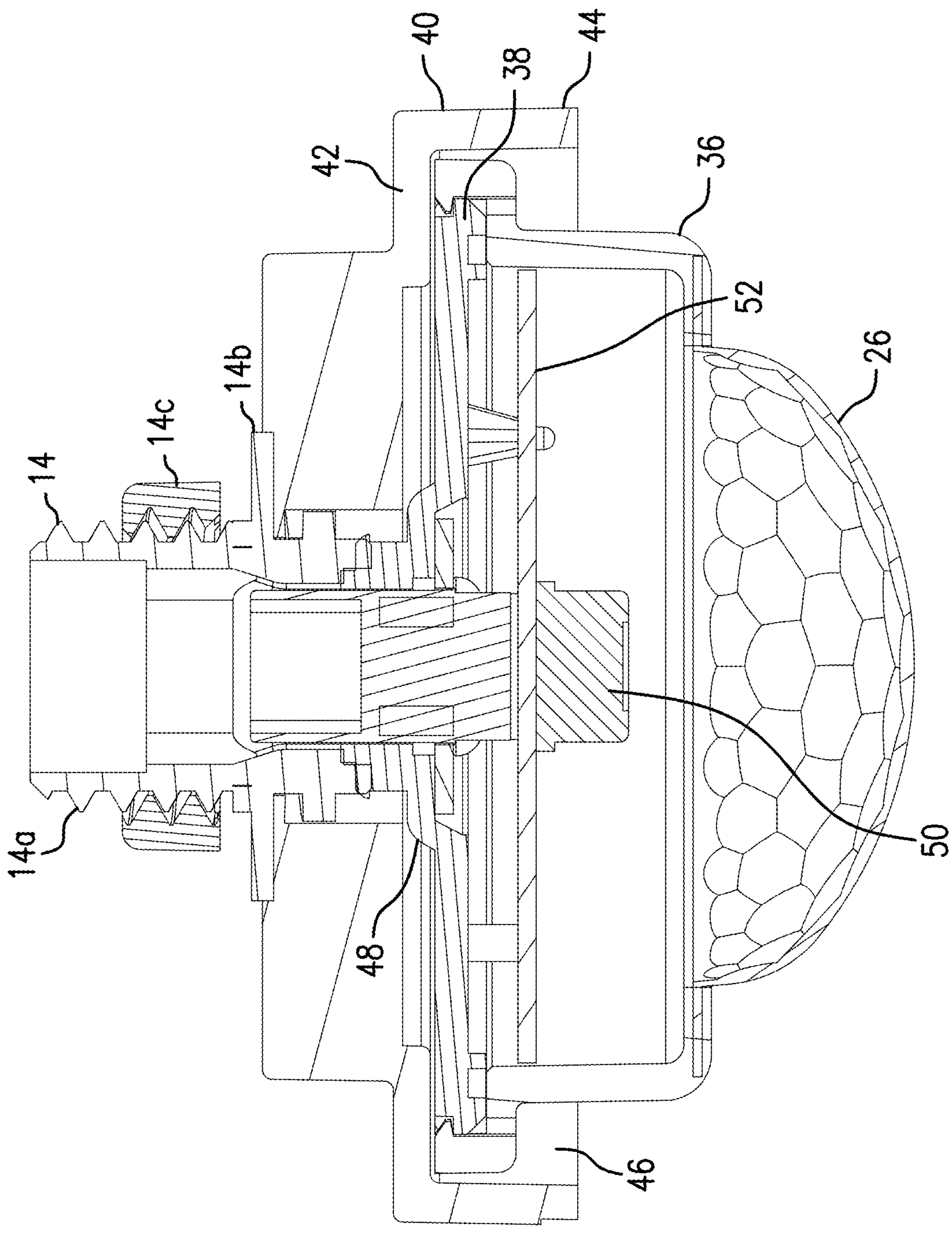
Figure 18:
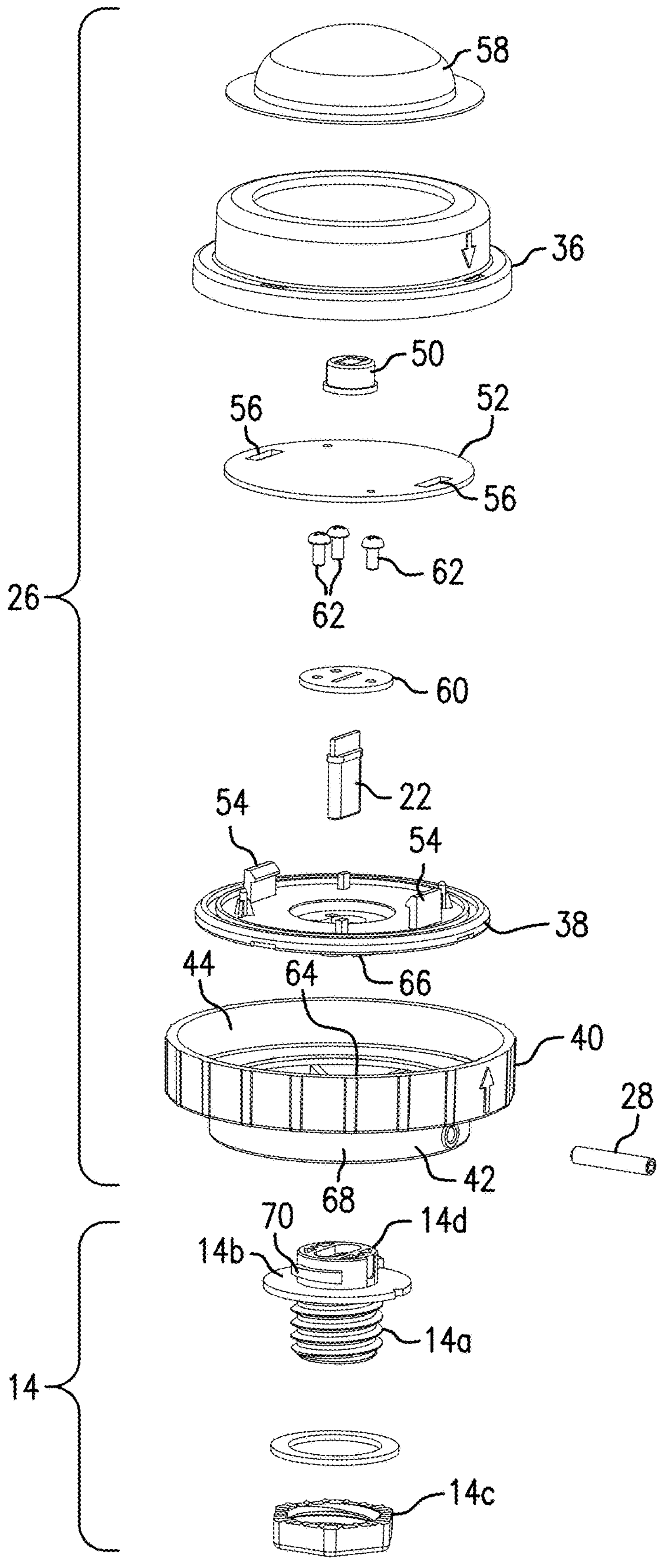
Figure 19:
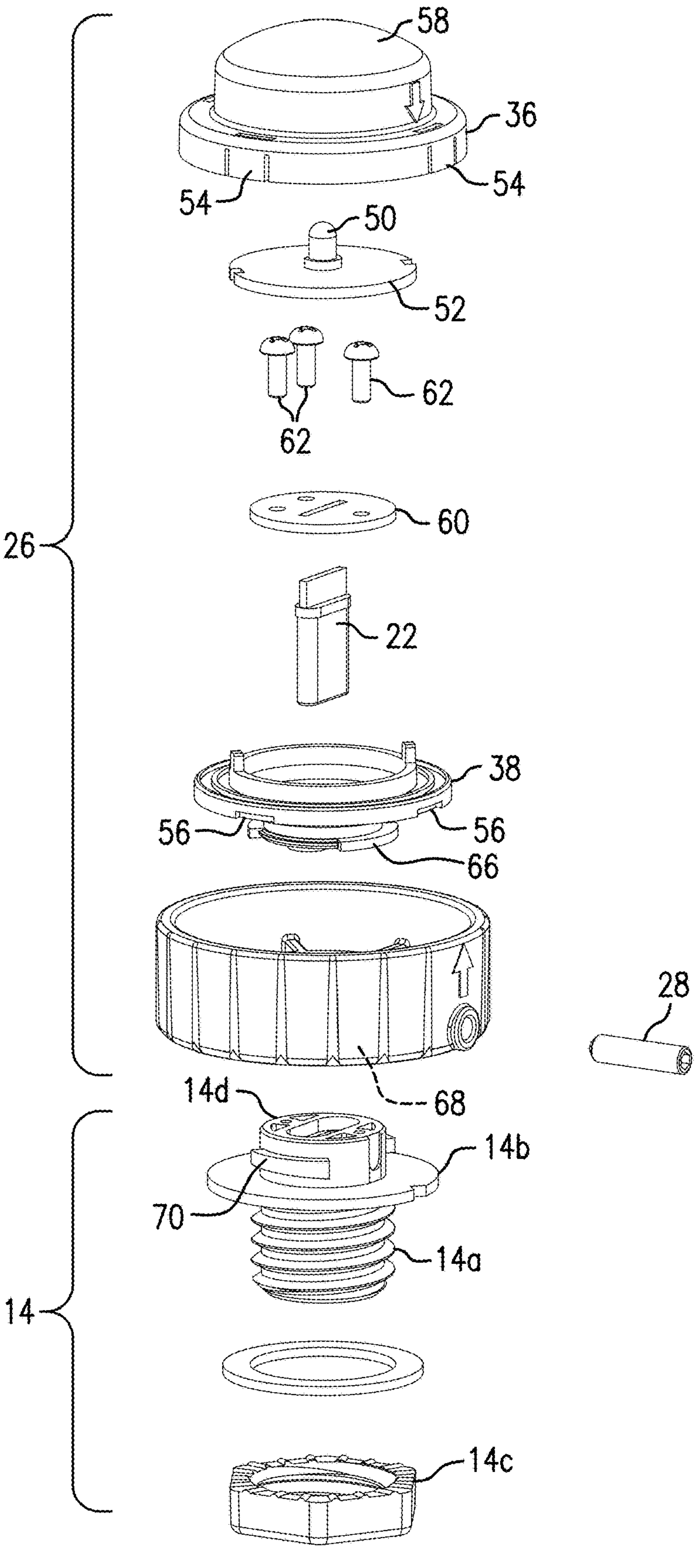

As indicated above, the socket 14 and the plug 22 may be configured to allow for relative rotation therebetween, e.g., having a round interface such as that provided where the socket 14 and the plug 22 are configured as an audio jack/audio jack plug connection. It is further noted that the configuration of the socket 14 and the plug 22 may not permit relative rotation therebetween, for example, where the socket 14 and the plug 22 are configured as a USB connector/port. This may result from the socket 14 and the plug 22 having a non-round interface, such as that provided with a USB connector/port interface. Here, it is preferred that the accessory 26 be mounted to the body 20 to limit rotation of the plug 22 relative to the socket 14, particularly post-mounting. With this arrangement, as shown in FIGS. 13-19, the socket 14 may be mounted to the body 20, as described above, with the socket body 14*a* extending through the opening in the body 20 with the locking nut 14*c* threadedly mounted to the socket body 14*a*. As above, with tightening of the locking nut 14*c*, the collar 14*b* and the locking nut 14*c* generate pressure against the body 20 to hold the socket 14 in place. Washers, lock washers, and/or adhesive may be provided between the locking nut 14*c* and the socket body 14*a* and/or the body 20 to limit loosening of the locking nut 14*c* during use, particularly due to vibration. As shown in FIGS. 16, 18 and 19, the socket body 14*a* may be provided with a notch 14*d*, particularly above the collar 14*b*, formed to receive a set screw 28. The set screw 28 is formed to extend through a portion of a housing 36 or base portion 42 of accessory 26. The interengagement of the set screw 28 and the notch 14*d* restricts rotational movement of the accessory 26 relative to the socket 14, thus, minimizing strain on the plug 22 when connected to the socket 14. The set screw 28 may be provided as a threaded body, with no screw head, having an open end formed to receive a tool, such as an Allen wrench, for causing rotation thereof.

Figure 20:
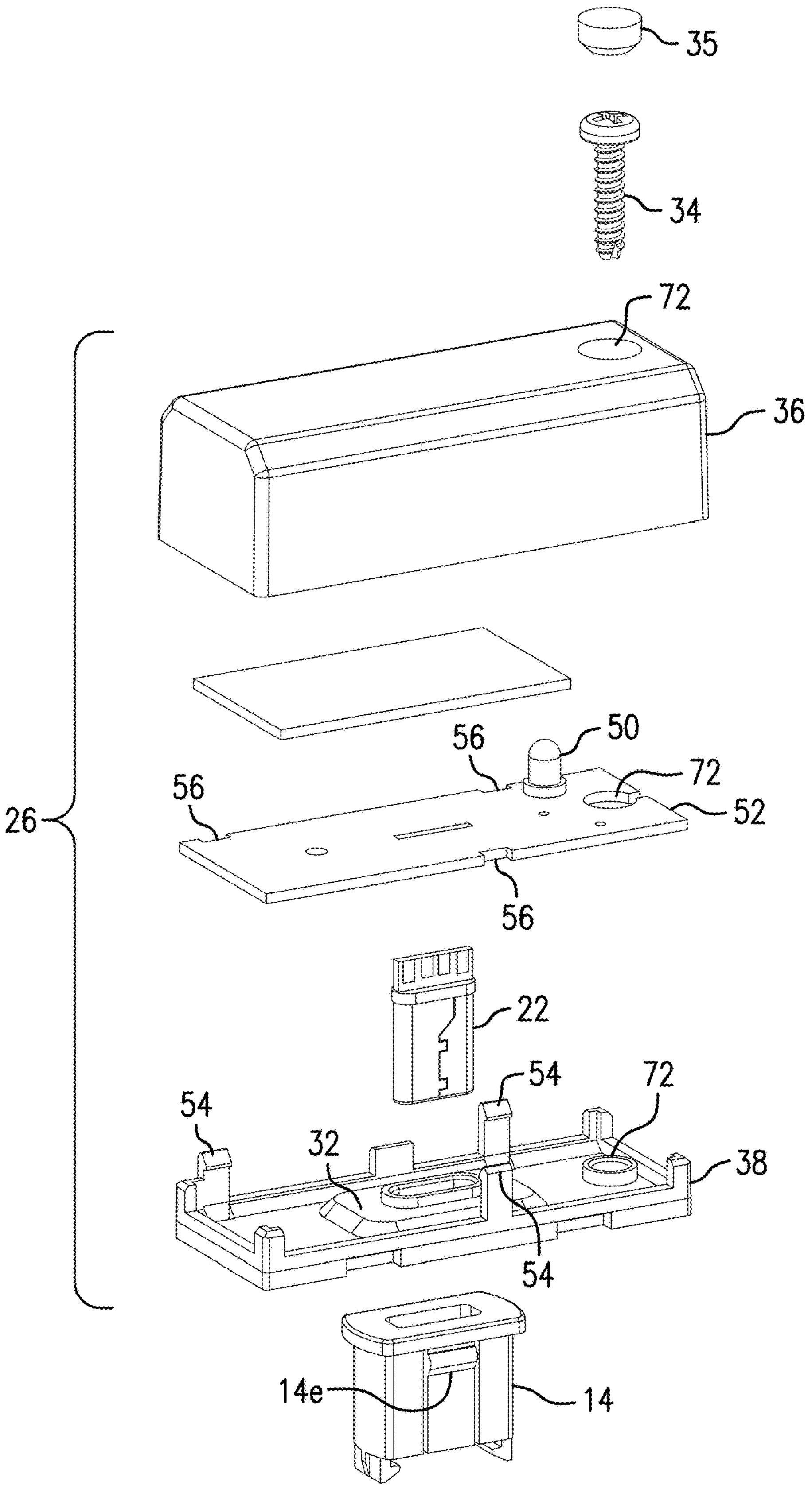

Alternatively, as shown in FIGS. 9 and 20, the socket 14 may be provided with a non-circular profile for shape-mating engagement with a recess 32 in the accessory 26. The shape of the non-circular profile and the recess 32 are selected to prevent rotation therebetween, e.g., being generally rectangular, polygonal, irregular, and so forth. With the socket 14 received in the recess 32, rotation of the plug 22, relative to the socket 14, is limited. Optionally, one or more mounting screws 34 may be also provided, formed to pass through at least a portion of the accessory 26, into engagement with the body 20. The mounting screw(s) 34 may be sheet-metal screws formed to threadedly engage a panel of the body 20. One or more caps or covers 35 may be provided to hide the mounting screw(s) 34 for aesthetic and security purposes.

In addition, as shown in FIG. 20, socket 14 may be provided with mounting detents 14*e* spaced below the collar 14*b* to snap engage with a portion of the body 20 about the opening 21. In this configuration, the locking nut 14*c* is not required.

As shown in FIGS. 16-19, the accessory 26 may be formed of multiple components including a housing 36 formed to be mounted to an inner mounting plate 38 received in an outer mounting ring 40. The outer mounting ring 40 may include a base portion 42 with an upstanding skirt 44 formed to circumscribe the inner mounting plate 38. Preferably, the skirt 44 defines an inner diameter greater than the diameter of the inner mounting plate 38 to define an air gap 46, which may be discontinuous or continuous so as to be annular. In addition, the inner mounting plate 38 may be formed with a tapered rear surface 48, being angled downwardly towards the air gap 46 to allow for any water collected between the inner mounting plate 38 and the outer mounting ring 40 to run off.

Any electronic components 50 may be provided within the accessory 26 as needed, e.g., such as any of the sensors, communication components, and so forth, discussed above. The electronic components 50 may be secured to a plate or printed circuit board 52, which in turn, may be secured to the inner mounting plate 38 with snap-fit arms 54 snap engaging slots 56 in plate or printed circuit board 52, as shown in FIG. 18. Alternatively, as shown in FIG. 19, the snap-fit arms 54 may be provided on the housing 36 formed to engage the slots 56 formed on the inner mounting plate 38. Depending on the need for signal transparency, a lens 58 may be provided which is, at least, in part transparent to any signals necessary for detection, such as ambient light, infrared, and so forth. The lens 58 may be provided as a separate component or integral with the housing 36. A fixture plate 60 may be provided for securing the plug 22, which may be configured as a USB port. The fixture plate 60 may be secured to the inner mounting plate 38 by screws 62.

As shown in FIGS. 18 and 19, the outer mounting ring 40 may be provided with an inner locking thread 64 for threaded engagement with thread 66 located on the inner mounting plate 38, and with an outer locking thread 68 for threaded engagement with locking thread 70, provided on the socket 14. For assembly, the outer mounting ring 40 is secured to the socket 14. The housing 36, with the plug 22 and the electronic component(s) 50 mounted to the inner mounting plate 38, is then secured to the outer mounting ring 40 with the set screw 28 thereafter being introduced to engage the notch 14*d*. The set screw 28 restricts rotation of the accessory 26, and components thereof, thereby resisting loosening due to vibration and providing an anti-theft measure. Points of connection, or open points, may be sealed, as known in art (e.g., with gasketing, silicone, etc.), particularly where the accessory 26 is exposed to humid conditions or temperature extremes. Industry standards may be followed in ensuring sealing of sufficient integrity. Vibration, anti-theft/vandal and environmental/weather resistant enclosure specifications and requirements are set forth in, and incorporated herein by reference, NEMA Enclosure Ratings, including, e.g., IP66 one of the highest NEMA Ingress Protection ratings for an enclosure that is (i) dust tight with no ingress of dust for two to eight hours and (ii) protected from water from heavy seas or water projected in powerful jets not entering the enclosure in harmful quantities, and other such enclosure standards that are or may become available.

As shown in FIG. 20, the inner mounting plate 38 may be formed with a rectangular shape with the snap-fit arms 54 formed to engage the slots 56 formed in the plate or printed circuit board 52 with the electronic components 50 being secured thereon. The housing 36, the printed circuit board 52, and the inner mounting plate 38 may be provided with openings 72 to allow passage therethrough of the screw(s) 34 into engagement with the body 20.

Figure 21:
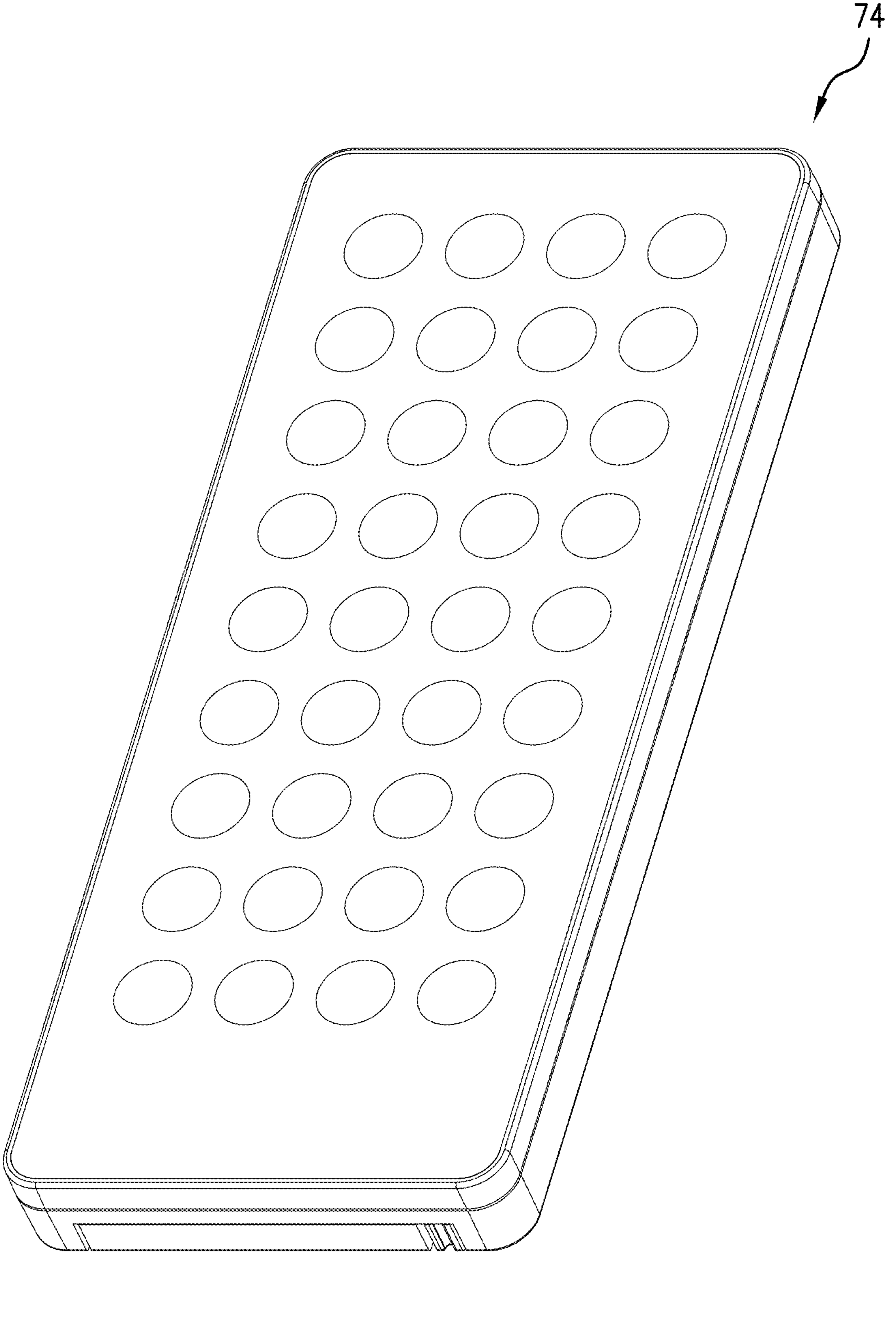
FIG. 21 shows a remote control useable with the subject invention.
Figure 23:
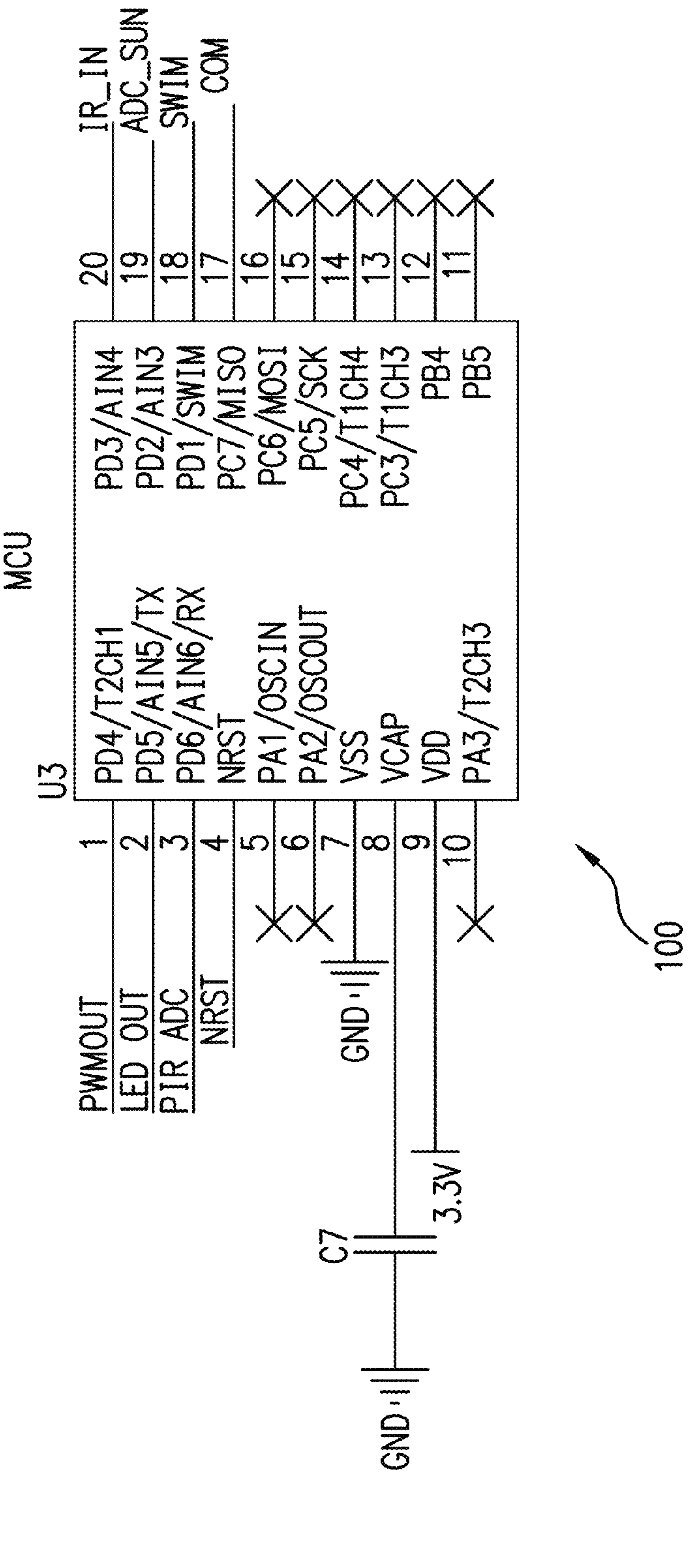

As an additional feature, with the accessory 26 including a signal receiver, such as a wireless or infrared receiver, a remote control 74 may be provided for issuing various signal commands to the accessory 26 to control, or otherwise interact, with the solid-state lighting fixture assembly 10. The remote control 74, shown in FIG. 21, may be of any known configuration for transmitting signals wirelessly or by infrared transmission. The remote control 74 may be used for control (e.g., on/off, dimming, etc.), adjusting settings of the solid-state lighting fixture assembly 10 (e.g., setting "no motion" time period to turn off lights, dawn/dusk settings, etc.), and/or retrieving data from a Microcontroller Unit ("MCU") 100 which may have been collected by accessory 26. MCU 100 controls the overall operation and functionality of accessory 26 and, as known in the art includes a central processing unit ("CPU"), some memory for storing data and operational programs and circuitry to implement peripheral functionality. An example of MCU control circuitry 100 (e.g., using an STM8S003F3P6 from STMicroelectronics) is shown in FIG. 23.

Figure 22:
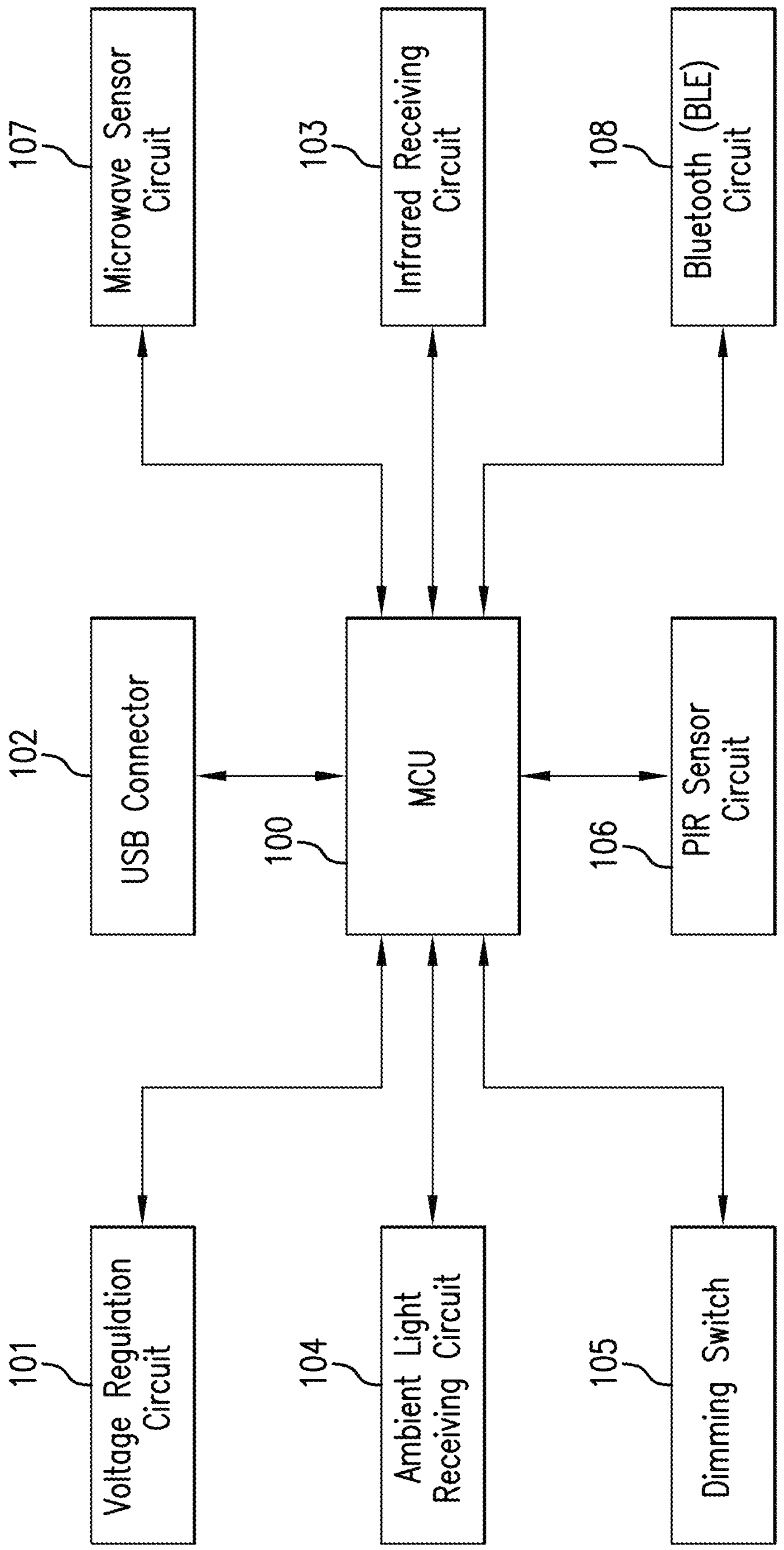
FIGS. 22-31 are schematics of circuit designs useable with the subject invention.
Figure 24:
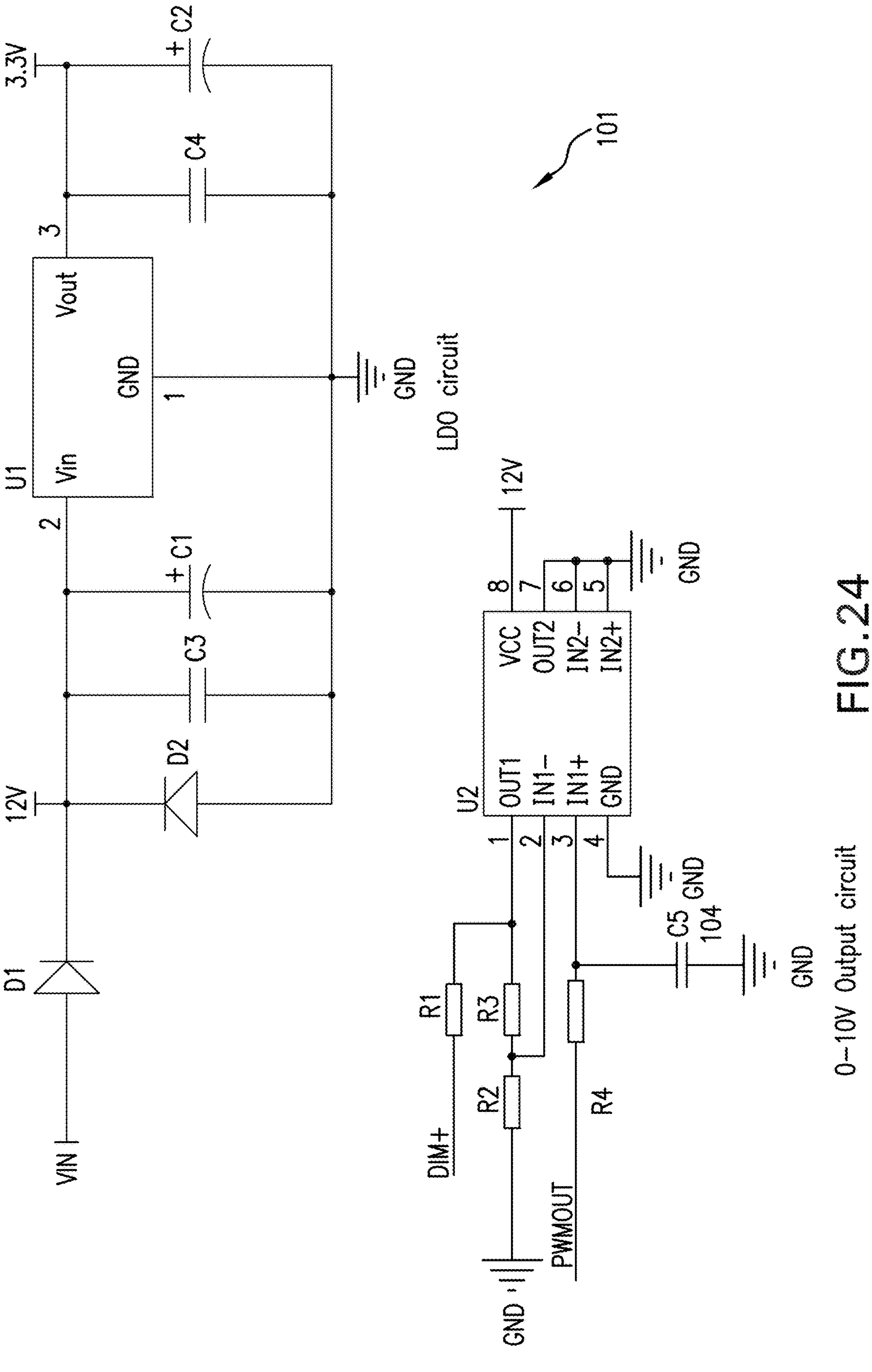
Figure 25:
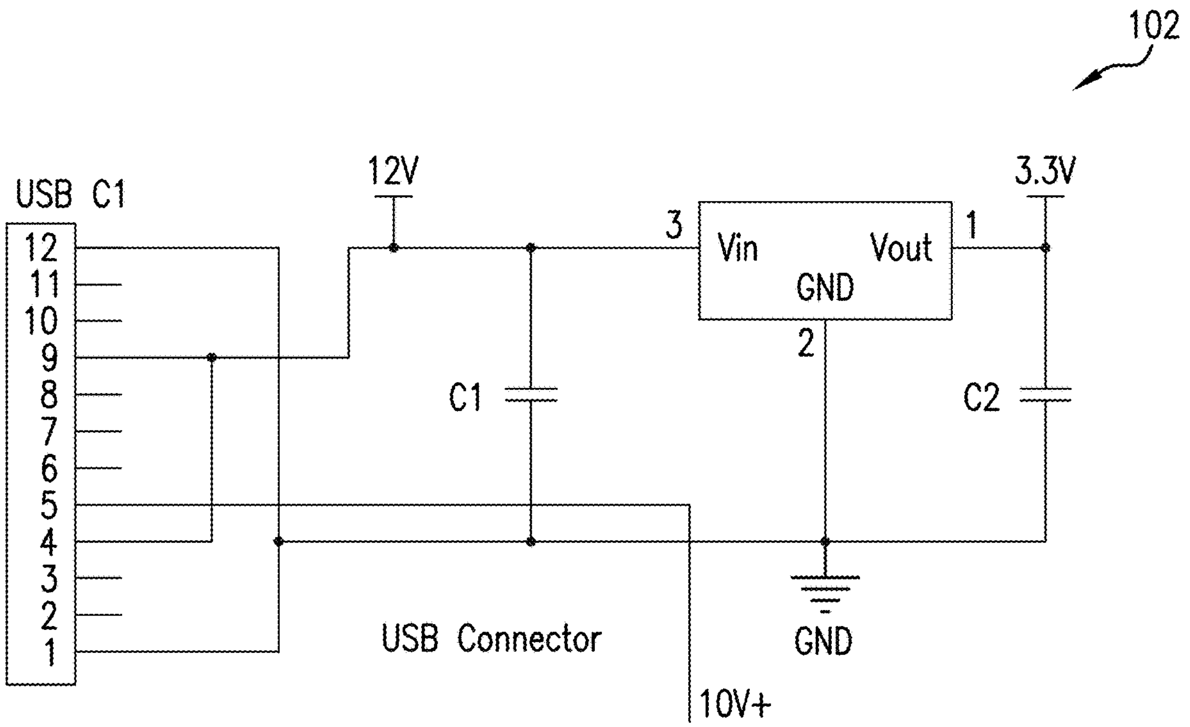
Figure 26:
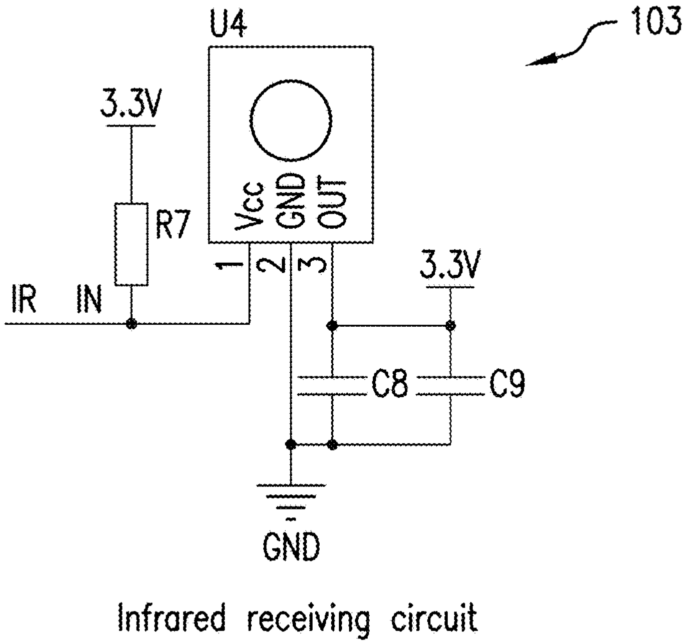
Figure 27:
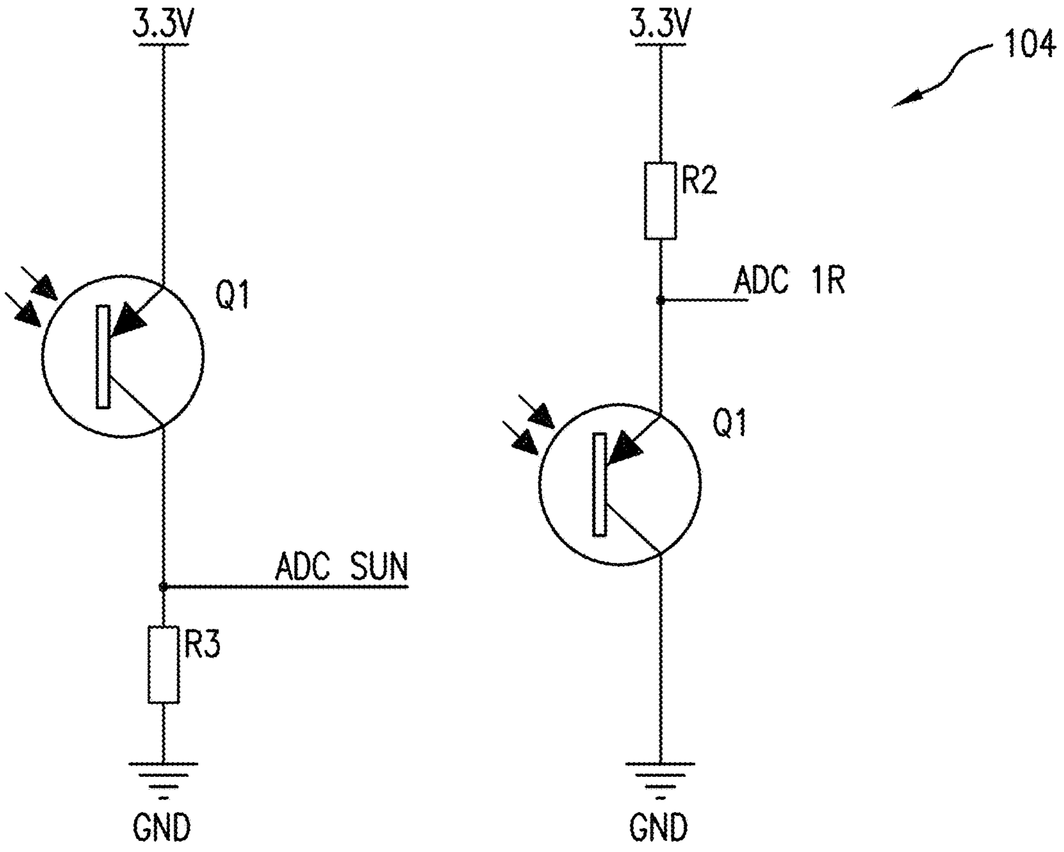
Figure 28:
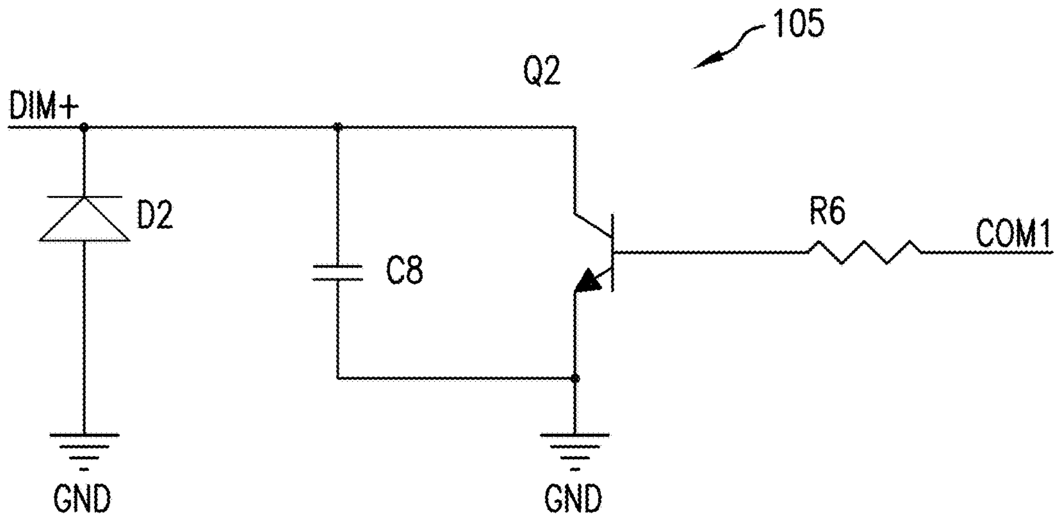
Figure 29:
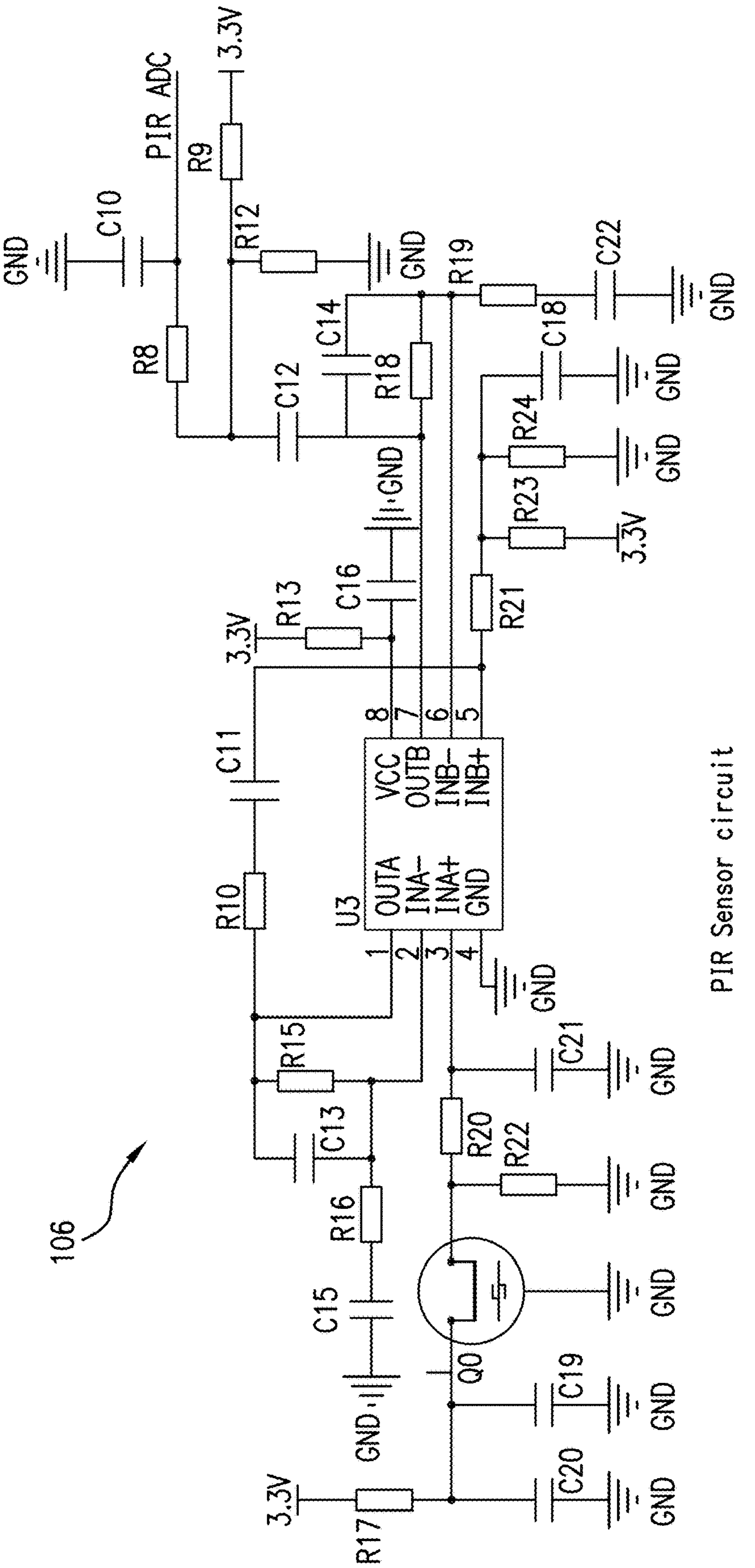
Figure 30:
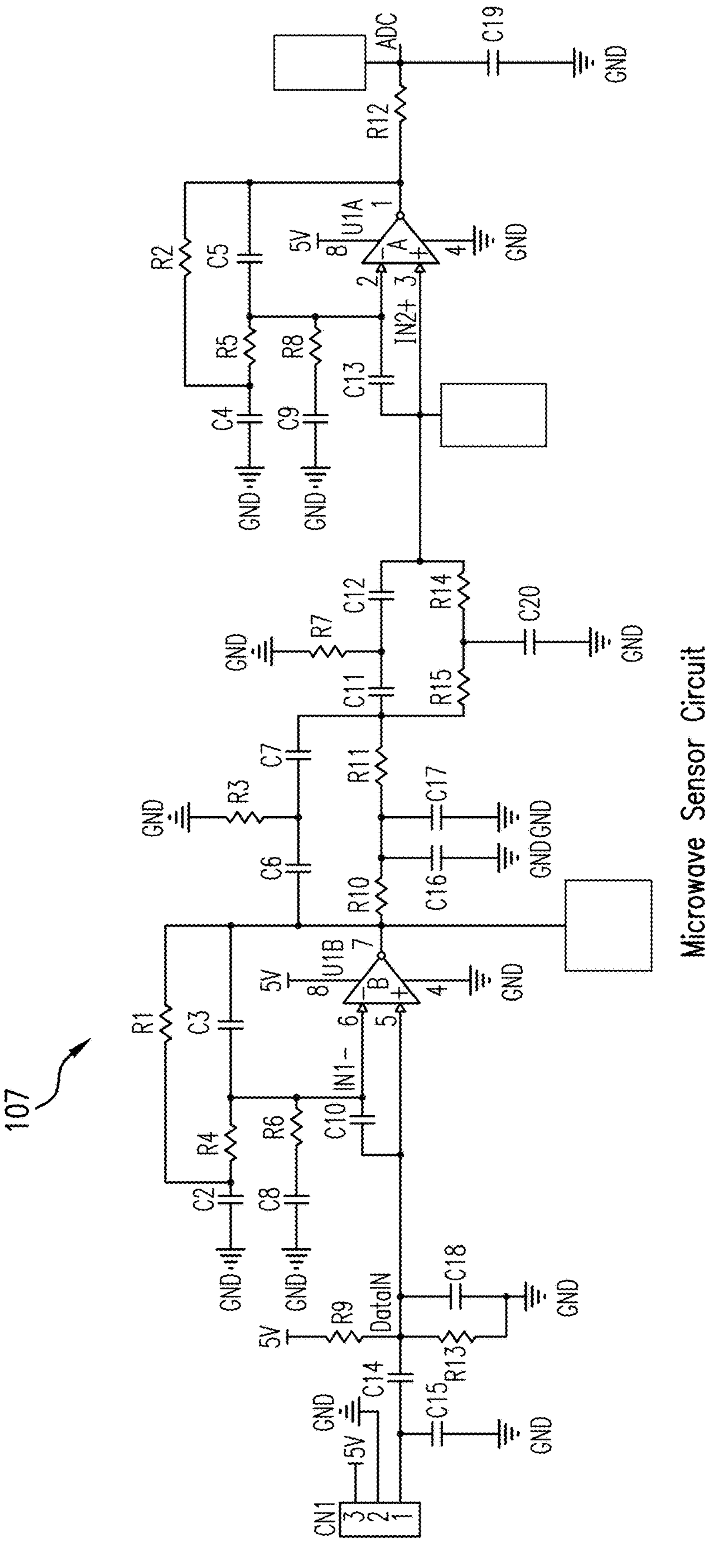

FIG. 22 shows a general block diagram schematic for various circuitry blocks that may be included in an accessory 26 of the subject invention with MCU control circuitry 100 at the core of the system to control all circuitry within accessory 26 as noted above. FIG. 24 shows an example voltage regulation circuit 101 that provides accessory 26 with power (e.g., 3.3V and 12V) necessary for its overall operation and control with VIN being provided to accessory 26 from electrical conductor 24 either from an auxiliary power output connection on lighting fixture 12 or a battery power pack 18 within lighting fixture 12, as shown in FIG. 3. Alternatively, battery power pack 18 may be included within accessory 26 and charged using power from electrical conductor 24 or by accessory 26 itself, if accessory 26 is fitted with conventional solar cells like those currently used to charge on-board batteries.

Figure 31:
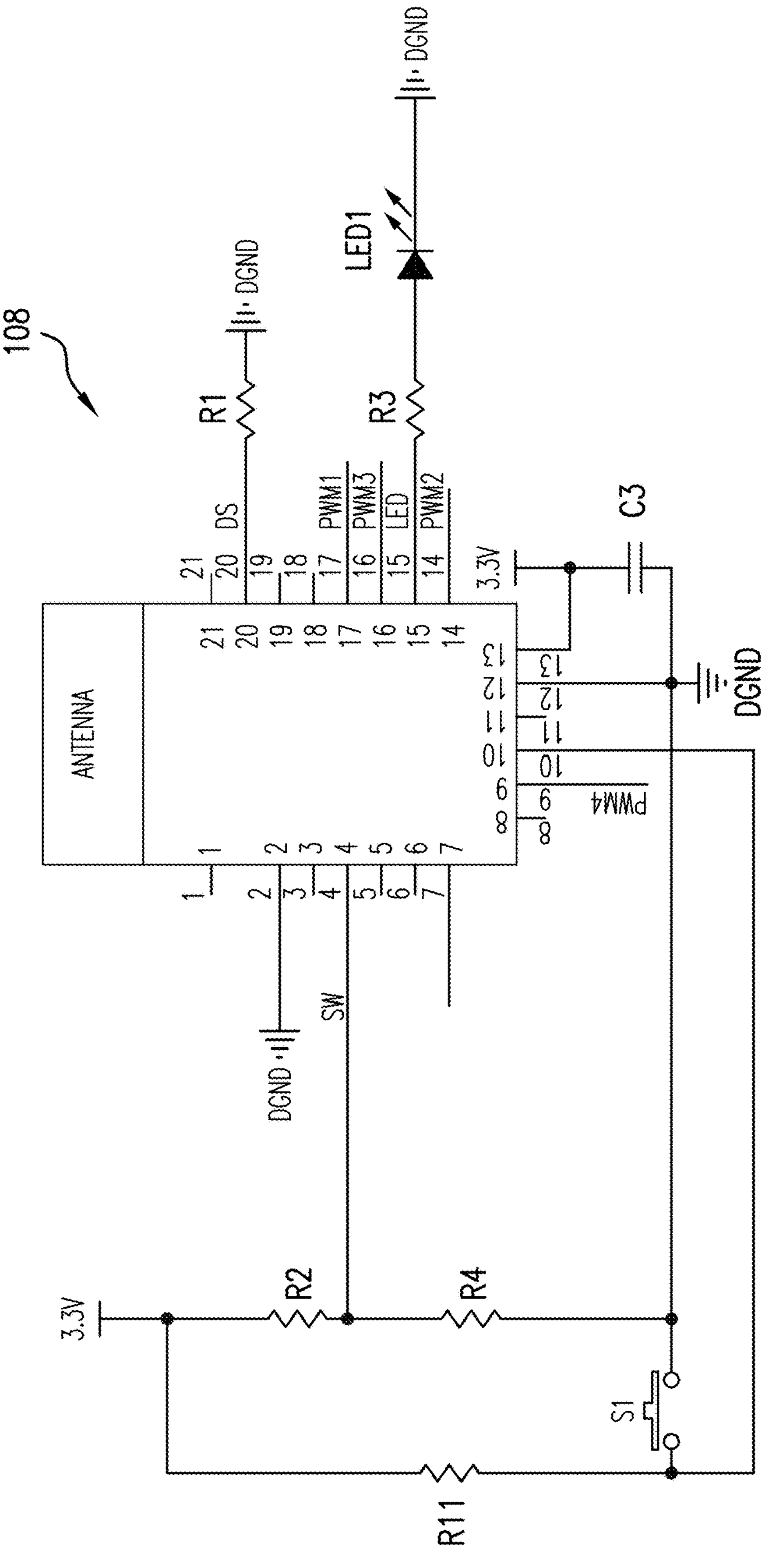

Examples of the other circuitry blocks in FIG. 22 connected to MCU control circuitry 100 are shown in FIGS. 25-31 and it should be understood that one or more of these circuitry blocks may be included in accessory 26 depending upon the functionality that is desired to be added to lighting fixture 12. More particularly, communications in and out of accessory 26 can be provided using, for example, a USB connector 102 (FIG. 25), an infrared receiving circuit 103 (FIG. 26) and/or a Bluetooth (BLE) circuit 108 (any commercially available BLE Module device such as those from Cyprus, Fanstel or Microship Technology) (FIG. 31). Likewise, an ambient light receiving circuit 104 (FIG. 27) can be included for sensing light and a dimming switch 105 (FIG. 28) can be provided to adjust LED brightness of lighting fixture 12 based on the amount of ambient light sensed by ambient light receiving circuit 104. In addition, as discussed above, accessory 26 can provide motion sensing functionality to lighting fixture 12 to monitor and record movement and/or turn lighting fixture 12 on and off using (i) a Passive Infrared ("PIR") sensor circuit 106 (e.g., using a common LM258 series operational amplifier) like that shown in FIG. 29 or a microwave sensor circuit 107 similar to the one shown in FIG. 30. Again, note that all of the circuitry blocks shown in FIGS. 23-31 and described above are merely exemplary, as there are many such circuits available to provide these features in accordance with the current invention. In addition, note accessory 26 may take many forms and include any combination of the circuits discussed above including, but not limited to, the plug shape shown in FIGS. 4-8 and 12-19 or the rectangular shape shown in FIGS. 9 and 20. As will be recognized by those skilled in the art, the subject invention is not limited to these arrangements or circuits.

What is claimed is:

1. A lighting fixture assembly comprising:

a body;

a socket mounted on said body, said socket being externally accessible from outside the body, wherein the socket is in the form of an audio jack; and, an accessory having a housing and a plug in the form of an audio jack plug, the plug being receivable in the socket, wherein said housing contains at least one communication component which provides wireless communication.

2. The lighting fixture assembly as in claim 1, wherein said accessory contains at least one sensor.

3. The lighting fixture assembly as in claim 2, wherein said at least one sensor is configured to detect motion.

4. The lighting fixture assembly as in claim 2, wherein said at least one sensor is configured to detect ambient light levels.

5. The lighting fixture assembly as in claim 2, wherein said at least one sensor collects and stores sensor data and said at least one communication component provides wireless communication of the sensor data stored by said at least one sensor.

6. The lighting fixture assembly as in claim 1, wherein said accessory includes at least one thread element, wherein at least one secondary thread element is associated with said body, and, wherein said accessory is rotatable relative to said socket with said at least one thread element engaging the at least one secondary thread element.

7. The lighting fixture assembly as in claim 1, wherein said socket is through-panel-mounted to said body.

8. The lighting fixture assembly as in claim 1, wherein the plug has two or more contacts.

9. The lighting fixture assembly as in claim 8, wherein the plug includes a positive contact, a negative contact, and a ground.

10. The lighting fixture assembly as in claim 1, wherein the at least one communication component provides two-way wireless communication.

11. The lighting fixture assembly as in claim 1, wherein the at least one communication component includes a wireless receiver.

12. The lighting fixture assembly as in claim 11, wherein the at least one communication component includes a wireless transceiver.

13. The lighting fixture assembly as in claim 1, wherein the at least one communication component includes a wireless transceiver.

* * * * *